(12) United States Patent
Miyashita et al.

(10) Patent No.: US 9,097,376 B2
(45) Date of Patent: Aug. 4, 2015

(54) SPHERICAL ANNULAR SEAL MEMBER AND METHOD OF MANUFACTURING THE SAME

(75) Inventors: Osamu Miyashita, Kanagawa (JP); Eiji Satou, Kanagawa (JP); Koichi Ishida, Kanagawa (JP); Toshikazu Takasago, Oita (JP); Satoshi Matsunaga, Oita (JP)

(73) Assignee: OILES CORPORATION, Tokyo (JP)

( * ) Notice: Subject to any disclaimer, the term of this patent is extended or adjusted under 35 U.S.C. 154(b) by 39 days.

(21) Appl. No.: 14/110,809

(22) PCT Filed: Apr. 9, 2012

(86) PCT No.: PCT/JP2012/002476
§ 371 (c)(1),
(2), (4) Date: Oct. 9, 2013

(87) PCT Pub. No.: WO2012/140868
PCT Pub. Date: Oct. 18, 2012

(65) Prior Publication Data
US 2014/0027986 A1    Jan. 30, 2014

(30) Foreign Application Priority Data

Apr. 13, 2011 (JP) ................. 2011-089153

(51) Int. Cl.
*F16J 15/12* (2006.01)
*F16L 23/22* (2006.01)
(Continued)

(52) U.S. Cl.
CPC .............. *F16L 23/22* (2013.01); *B29C 70/028* (2013.01); *F01N 13/1827* (2013.01); *F16J 15/0812* (2013.01); *F16L 27/073* (2013.01)

(58) Field of Classification Search
CPC ............ F16J 15/02; F16J 15/028; F16J 15/06; F16J 15/002; F16J 15/065; F16J 15/08; F16J 15/0806; F16J 15/0812; F16J 15/12; F16J 15/10; F16J 15/104; F16J 15/121
See application file for complete search history.

(56) References Cited

U.S. PATENT DOCUMENTS 4,902,024 A * 2/1990 Takenoshita ................. 277/627
4,907,788 A * 3/1990 Balsells ....................... 267/168
(Continued)

FOREIGN PATENT DOCUMENTS

CN       101903690       12/2010
EP       1 429 059 A1     6/2004
(Continued)

OTHER PUBLICATIONS

Chinese Office Action dated Dec. 31, 2014 re Chinese Application No. 201280018227.8 (with partial English translation).
(Continued)

*Primary Examiner* — Vishal Patel
(74) *Attorney, Agent, or Firm* — Nixon & Vanderhye P.C.

(57) ABSTRACT

A spherical annular seal member 46 includes a spherical annular base member 42 defined by a cylindrical inner surface 38, a partially convex spherical surface 39, and large- and small-diameter side annular end faces 40 and 41 of the partially convex spherical surface 39; a plurality of partially convex spherical intermediate layers 43 formed integrally on the partially convex spherical surface 39 of the spherical annular base member 42 and laminated in a radial direction; and an outer layer 45 formed integrally on a partially convex spherical surface 44 of the outermost partially convex spherical intermediate layer 43 of these partially convex spherical intermediate layers 43.

8 Claims, 9 Drawing Sheets

(51) Int. Cl.
*F01N 13/18* (2010.01)
*F16L 27/073* (2006.01)
*B29C 70/02* (2006.01)
*F16J 15/08* (2006.01)

(56) References Cited

U.S. PATENT DOCUMENTS

| | | | |
|---|---|---|---|
| 5,358,262 A * | 10/1994 | Roberts | 277/652 |
| 5,451,064 A | 9/1995 | Mercuri et al. | |
| 5,462,291 A | 10/1995 | Maeda et al. | |
| 5,499,825 A | 3/1996 | Maeda et al. | |
| 5,615,479 A | 4/1997 | Maeda et al. | |
| 2004/0207162 A1 | 10/2004 | Kubota et al. | |
| 2010/0253011 A1 | 10/2010 | Maeda et al. | |
| 2010/0270754 A1 | 10/2010 | Kubota et al. | |

FOREIGN PATENT DOCUMENTS

| | | |
|---|---|---|
| GB | 2 271 398 A | 4/1994 |
| JP | 54-76759 | 6/1979 |
| JP | 10-009397 | 1/1998 |
| JP | 2003-014177 | 1/2003 |
| JP | 2003-97718 | 4/2003 |
| WO | WO 2009/072295 | 6/2009 |
| WO | WO 2009/078165 | 6/2009 |

OTHER PUBLICATIONS

Supplemental European Search Report; EP 12 77 0635; dated Sep. 10, 2014.
International Search Report for PCT/JP2012/002476 mailed Jul. 10, 2012.

* cited by examiner

SPHERICAL ANNULAR SEAL MEMBER AND METHOD OF MANUFACTURING THE SAME

This application is the U.S. national phase of International Application No. PCT/JP2012/002476 filed 9 Apr. 2012 which designated the U.S. and claims priority to JP 2011-089153 filed 13 Apr. 2011, the entire contents of each of which are hereby incorporated by reference.

TECHNICAL FIELD

The present invention relates to a spherical annular seal member used in a spherical pipe joint for an automobile exhaust pipe and a method of manufacturing the same.

BACKGROUND ART

As for exhaust gases of an automobile engine, in FIG. 21 which shows one example of an exhaust passage of an automobile engine, exhaust gases generated in the respective cylinders (not shown) of the engine are gathered in an exhaust manifold catalyst converter 600 and are sent to a sub muffler 603 through an exhaust pipe 601 and an exhaust pipe 602. The exhaust gases which passed through this sub muffler 603 are further sent to a muffler 606 through an exhaust pipe 604 and an exhaust pipe 605, and are released to the atmosphere through this muffler 606.

Exhaust system members such as these exhaust pipes 601 and 602 as well as 604 and 605, the sub muffler 603, and the muffler 606 are subjected to repeated stress owing to such as the roll behavior and vibration of the engine. Particularly in the case of a high-speed rotation and high-output engine, the stress applied to the exhaust system members becomes quite large. Accordingly, the exhaust system members have a possibility of bringing about a fatigue failure, and the engine vibration can cause the exhaust system members to resonate, thereby deteriorating compartment quietness in some cases. To overcome these problems, a connecting portion 607 between the exhaust manifold catalyst converter 600 and the exhaust pipe 601 and a connecting portion 608 between the exhaust pipe 604 and the exhaust pipe 605 are movably connected by a vibration absorbing mechanism such as an exhaust pipe spherical joint or a bellows type joint, whereby advantages are provided in that the stress is absorbed to which the exhaust system members are repeatedly subjected due to such as the roll behavior and vibration of the automobile engine, thereby preventing the fatigue failure and the like of these exhaust system members and overcoming the problem that engine vibration causes the exhaust system members to resonate and deteriorates the quietness of the compartment interior of the automobile.

PRIOR ART DOCUMENTS

Patent Documents

Patent Document 1: JP-A-54-76759
Patent Document 2: WO 2009/078165

SUMMARY OF THE INVENTION

Problems to be Solved by the Invention

As one example of the above-described vibration absorbing mechanism, it is possible to cite an exhaust pipe joint described in Patent Document 1 and an exhaust seal which is used in that joint. The exhaust seal described in this Patent Document 1 has advantages in that it is heat resistant, excels in affinity with a mating member, and has remarkably improved impact strength; however, the exhaust seal has a drawback in that it often generates abnormal noise when it undergoes friction under dry frictional conditions. The drawback of this exhaust seal is conceivably attributable to, among others, the fact that there is a large difference between the coefficient of static friction and the coefficient of dynamic friction of a heat-resistant material (such as expanded graphite) for forming that exhaust seal, and to the fact that the frictional resistance of the exhaust seal constituted by this heat-resistant material exhibits negative resistance with respect to its sliding velocity.

As a spherical annular seal member for overcoming the drawbacks of the above-described exhaust seal, one disclosed in Patent Document 2 is known. A spherical annular seal member 700 described in this Patent Document 2 and shown in FIGS. 22 and 23 is comprised of: a spherical annular base member 705 defined by a cylindrical inner surface 701, a partially convex spherical surface 702, and large- and small-diameter side annular end faces 703 and 704 of the partially convex spherical surface 702; and an outer layer 706 formed integrally on the spherical annular base member 705. The spherical annular base member 705 includes a reinforcing member 707 made from a metal wire net and a heat-resistant material 708 containing expanded graphite and compressed in such a manner as to fill meshes of the metal wire net of the reinforcing member 707 and to be integrated with the reinforcing member 707 in mixed form, and the outer layer 706 is comprised of a base layer 714 which includes a reinforcing member 709 made from a metal wire net and compressed and a heat-resistant material 713 containing expanded graphite, compressed in such a manner as to fill meshes of the metal wire net of the reinforcing member 709 and to be tightly pressure bonded to the reinforcing member 709, and having a surface 712 which is flush with a surface 710 of the reinforcing member 709 and forms an outer layer intermediate surface 711 together with that surface 710, the base layer 714 being formed integrally with the partial convex spherical surface 702, and of a sliding layer 715 of a lubricating composition which is integrally adhered to and formed on the base layer 714 at the outer layer intermediate surface 711. The outer layer intermediate surface 711 of the base layer 714 formed by the reinforcing member 709 and the heat-resistant material 713 in the outer layer 706 is dotted with the surface 710 of that reinforcing member 709 at an area ratio of 5 to 35%, the surface roughness of the outer layer intermediate surface 711 is 5 to 30 µm in the arithmetic mean roughness Ra, and a surface 716 of the outer layer 706 exposed to the outside is constituted by the smooth surface 717 of the sliding layer 715.

In the above-described spherical annular seal member 700, the outer layer intermediate surface 711 of the base layer 714 is dotted with the surface 710 of the reinforcing member 709 at an area ratio of 5 to 35%, the sliding layer 715 of a lubricating composition is integrally formed by being coated on that outer layer intermediate surface 711, and the surface 716 of the outer layer 706 exposed to the outside is formed by a smooth surface 717 of the sliding layer 715. Therefore, in the sliding friction with the mating member, it is possible to avoid local friction of the reinforcing member 709 at the outer layer 706 with the surface of the mating member, with the result that it is possible to prevent the damaging and roughening of the surface of the mating member due to sliding friction as practically as possible, thereby making it possible to prevent a decline in sealability. In addition, since the sliding friction takes place through an appropriate lubricating film formed on the surface of the mating member by virtue of the action of scraping off an excessive lubricating film formed on the surface of the mating member, it is possible to prevent the generation of abnormal frictional noise as practically as possible.

The spherical annular seal member described in Patent Document 2 has the above-described advantages. However, in cases where very small oscillating motions or excessive axial loads occurring during, for instance, idling or waiting for a traffic light are applied to the spherical annular seal member 700 continuously for long periods of time, the sliding layer 715 of the outer layer 706 can be worn away by the sliding friction with the mating member, and the sliding friction can then shift to that with the outer layer intermediate surface 711 constituted by the surface 710 of the reinforcing member 709 and the surface 712 of the heat-resistant material 713 flush with the surface 710 of that reinforcing member 709, with the result that the reinforcing member 709 of the outer layer intermediate surface 711 can be possibly worn. If the reinforcing member 709 of this outer layer intermediate surface 711 becomes worn, the sliding friction shifts to that with the heat-resistant material 713 of the outer layer intermediate surface 711, in which case, in the same way as the exhaust seal described in the above-described Patent Document 1, the surface of sliding friction with the mating member is constituted by the exposed surface of the heat-resistant material 713 alone, and therefore there is a possibility of generating abnormal frictional noise which is a drawback similar to that of the exhaust seal described in the above-described Patent Document 1

As a result of conducting strenuous studies in view of the above-described circumstances, by focusing attention on the partially convex spherical surface of the spherical annular seal member including the outer layer constituting the surface of sliding friction with the mating member, the present inventors found that a spherical annular seal member in which intermediate layers, which are each comprised of a reinforcing member made from a metal wire net and a heat-resistant material containing expanded graphite filling the meshes of the metal wire net of this reinforcing member and integrated with the reinforcing member in mixed form and in which the reinforcing member is exposed with an area ratio of a predetermined proportion, are laminated on the partially convex spherical surface of the spherical annular base member radially integrally and in multilayer form, in its sliding friction with the mating member undergoes sliding friction by a smooth composite surface where the surface of the heat-resistant material and the surface of the reinforcing member are constantly exposed in mixed form, so that the load applied to each of the heat-resistant material and the reinforcing member is reduced, with the result that even if very small oscillating motions or excessive axial loads are applied continuously for long periods of time, it is possible to prevent as practically as possible the generation of abnormal frictional noise without causing damage to the mating member.

The present invention has been devised in view of the above-described finding, and its object is to provide a spherical annular seal member which is capable of preventing as practically as possible the generation of abnormal frictional noise in its sliding friction with the mating member, as well as a method of manufacturing the same.

Means for Solving the Problems

A spherical annular seal member for use in an exhaust pipe joint in accordance with the present invention is comprising: a spherical annular base member defined by a cylindrical inner surface, a partially convex spherical surface, and large- and small-diameter side annular end faces of the partially convex spherical surface; a plurality of partially convex spherical intermediate layers which are formed integrally on the partially convex spherical surface of the spherical annular base member and are laminated in a radial direction; and an outer layer formed integrally on a partially convex spherical surface of an outermost one of the plurality of partially convex spherical intermediate layers, wherein the spherical annular base member includes a reinforcing member for the spherical annular base member made from a compressed knitted metal wire net which is knitted by using a fine metal wire with a diameter of 0.28 to 0.32 mm and whose mesh size is 4 to 6 mm long and 3 to 5 mm wide and a heat-resistant material for the spherical annular base member containing expanded graphite and compressed in such a manner as to fill meshes of the knitted metal wire net of the reinforcing member and to be formed integrally with the reinforcing member in mixed form, wherein each of the partially convex spherical intermediate layers includes a reinforcing member for the partially convex spherical intermediate layer made from the compressed knitted metal wire net which is knitted by using a fine metal wire with a diameter of 0.10 to 0.20 mm and whose mesh size is 1.0 to 3.0 mm long and 0.5 to 2.5 mm wide and a heat-resistant material for the partially convex spherical intermediate layer containing expanded graphite and compressed in such a manner as to fill meshes of the knitted metal wire net of the reinforcing member for the partially convex spherical intermediate layer and to be formed integrally with the reinforcing member in mixed form, an occupying area ratio of a surface constituted by the reinforcing member for the partially convex spherical intermediate layer on an outer surface of each of the partially convex spherical intermediate layers being 30 to 60%, and wherein the outer layer includes a reinforcing member for the outer layer made from a compressed knitted metal wire net which is knitted by using a fine metal wire with a diameter of 0.10 to 0.20 mm and whose mesh size is 1.0 to 3.0 mm long and 0.5 to 2.5 mm wide, a solid lubricant consisting of a lubricating composition, and a heat-resistant material for the outer layer containing expanded graphite, the heat-resistant material for the outer layer and the solid lubricant being compressed in such a manner as to fill meshes of the knitted metal wire net of the reinforcing member for the outer layer, an outer surface of the outer layer being formed into a smooth composite surface in which a surface constituted by the reinforcing member for the outer layer and a surface constituted by the solid lubricant are exposed in mixed form, an occupying area ratio of the surface constituted by the reinforcing member for the outer layer on the outer surface of the outer layer being 30 to 60%.

According to the spherical annular seal member in accordance with the present invention, in the outer layer constituting the surface of sliding friction with the mating member, the reinforcing member for the outer layer made from a knitted metal wire net which is knitted by using a fine metal wire with a diameter of 0.10 to 0.20 mm and whose mesh size is 1.0 to 3.0 mm long and 0.5 to 2.5 mm wide, the solid lubricant consisting of the lubricating composition, and the heat-resistant material for the outer layer containing expanded graphite are compressed such that the solid lubricant and the heat-resistant material for the outer layer are filled in meshes of the knitted metal wire net of the reinforcing member for the outer layer, and the outer surface of the outer layer is formed into a smooth composite surface in which a surface constituted by the reinforcing member for the outer layer and a surface constituted by the solid lubricant are exposed in mixed form, an occupying area ratio of the surface constituted by the reinforcing member for the outer layer on the outer surface of the outer layer is 30 to 60%. Therefore, in the sliding friction with the mating member, the load applied to each of the heat-resistant material and reinforcing member for the outer layer is reduced, with the result that even if very small oscillating motions or excessive axial loads are applied continuously for long periods of time, it is possible to prevent as practically as possible the generation of abnormal frictional noise without causing damage to the mating member.

Further, according to the spherical annular seal member in accordance with the present invention, even if this outer layer is worn away and lost due to the sliding friction with the mating member, and the sliding friction has shifted to that between the mating member and the partially convex spherical intermediate layer, since each of the plurality of partially convex spherical intermediate layers laminated in the radial direction includes the reinforcing member for the partially convex spherical intermediate layer made from the knitted metal wire net which is knitted by using a fine metal wire with a diameter of 0.10 to 0.20 mm and whose mesh size is 1.0 to 3.0 mm long and 0.5 to 2.5 mm wide and the heat-resistant material for the partially convex spherical intermediate layer containing expanded graphite and compressed in such a manner as to fill the meshes of the knitted metal wire net of this reinforcing member and to be formed integrally with the knitted metal wire net of that reinforcing member in mixed form, and since the occupying area ratio of the surface constituted by the reinforcing member for the partially convex spherical intermediate layer on the outer surface of each of the partially convex spherical intermediate layers is 30 to 60%, the sliding with the mating member constantly takes place by the exposed outer surface where the surface constituted by the reinforcing member for the partially convex spherical intermediate layer and the surface constituted by the heat-resistant material for the partially convex spherical intermediate layer are present in mixed form, and the load applied to each of the heat-resistant material and reinforcing member for the partially convex spherical intermediate layer is reduced. As a result, even if very small oscillating motions or excessive axial loads are applied continuously for long periods of time, the possibility of causing damage such as sliding friction tracks on the surface of the mating member is minimal, and it is possible to prevent as practically as possible the coarsening of the mating member surface due to the damage. Hence, it is possible to prevent as practically as possible a decline in sealability between the partially convex spherical surface of the partially convex spherical intermediate layer and the mating member and to prevent the generation of abnormal frictional noise as practically as possible.

In the spherical annular seal member in accordance with the present invention, its cylindrical inner surface may be a surface constituted by the expanded graphite of the heat-resistant material for the spherical annular base member or a surface constituted by the knitted metal wire net of the reinforcing member for the spherical annular base member.

In particular, if the cylindrical inner surface of the spherical annular base member of the spherical annular seal member is constituted by the surface of the knitted metal wire net of the reinforcing member for the spherical annular base member, friction between the cylindrical inner surface and the outer surface of the exhaust pipe is enhanced at the time of fitting and fixing the spherical annular seal member to the outer peripheral surface of the exhaust pipe, so that the spherical annular seal member is firmly fixed to the outer surface of the exhaust pipe.

In the spherical annular seal member in accordance with the present invention, each of the heat-resistant materials for the spherical annular base member, the partially convex spherical intermediate layer, and the outer layer may contain, in addition to expanded graphite, 1.0 to 16.0% by mass of a phosphate serving as an oxidation inhibitor, and may further contain therein 0.05 to 5.0% by mass of a phosphoric acid.

The heat-resistant material containing a phosphate serving as an oxidation inhibitor, or a phosphate and a phosphate, and expanded graphite is able to improve the heat resistance and oxidative wear characteristics of the spherical annular seal member itself, and permits the use of the spherical annular seal member in a high-temperature region.

In the spherical annular seal member in accordance with the present invention, the lubricating composition preferably contains 23 to 57% by mass of a hexagonal boron nitride, 5 to 15% by mass of hydrated alumina, and 33 to 67% by mass of a polytetrafluoroethylene resin.

According to such a spherical annular seal member, since the outer surface of the outer layer is formed into a smooth composite surface in which the surface made from the knitted metal wire net of the reinforcing member for the outer layer and the surface constituted by the solid lubricant consisting of 23 to 57% by mass of a hexagonal boron nitride, 5 to 15% by mass of hydrated alumina, and 33 to 67% by mass of a polytetrafluoroethylene resin are present in mixed form, it is possible to prevent the solid lubricant from dropping off the outer surface of the outer layer, with the result that the sliding with the mating member takes place over extended periods of time by the smooth surface in which the solid lubricant and the reinforcing member for the outer layer are present in mixed form, thereby making it possible to prevent the generation of abnormal frictional noise as practically as possible.

A method of manufacturing a spherical annular seal member in accordance with the present invention for use in an exhaust pipe joint and including a spherical annular base member defined by a cylindrical inner surface, a partially convex spherical surface, and large- and small-diameter side annular end faces of the partially convex spherical surface; a plurality of partially convex spherical intermediate layers which are formed integrally on the partially convex spherical surface of the spherical annular base member and are laminated in a radial direction; and an outer layer formed integrally on a partially convex spherical surface of an outermost one of the plurality of partially convex spherical intermediate layers, is comprising the steps of: (a) preparing an expanded graphite sheet constituted by expanded graphite; (b) preparing a belt-shaped knitted metal wire net which is knitted by using a fine metal wire with a diameter of 0.28 to 0.32 mm and whose mesh size is 4 to 6 mm long and 3 to 5 mm wide; (c) after forming a superposed assembly by superposing the belt-shaped knitted metal wire net on the expanded graphite sheet, convoluting the superposed assembly into a hollow cylindrical shape, to thereby form a tubular base part; (d) inserting another expanded graphite sheet constituted by expanded graphite between two layers of a hollow cylindrical knitted metal wire net which is knitted by using a fine metal wire with a diameter of 0.10 to 0.20 mm and whose mesh size is 1.0 to 3.0 mm long and 0.5 to 2.5 mm wide, and forming the hollow cylindrical knitted metal wire net into a flattened knitted metal wire net by pressurizing the hollow cylindrical knitted metal wire net with the other expanded graphite sheet inserted therein in a thicknesswise direction of the other expanded graphite sheet, to thereby form a sheet for the partially convex spherical intermediate layer in which the expanded graphite of the other expanded graphite sheet is filled in meshes of the flattened knitted metal wire net and which is constituted by the expanded graphite of the other expanded graphite sheet and the flattened knitted metal wire net integrated with the expanded graphite in mixed form, an occupying area ratio of a surface constituted by the flattened knitted metal wire net on an outer surface where the surface constituted by the flattened knitted metal wire net and a surface constituted by the expanded graphite of the other expanded graphite sheet are present in mixed form being 30 to 60%; (e) convoluting the sheet for the partially convex spherical intermediate layer around an outer peripheral surface of the tubular base part by at least two turns, to thereby form a tubular base member; (f) preparing still another expanded graphite sheet constituted by expanded graphite and forming a coating layer of a solid lubricant on one surface of the still other expanded graphite sheet, to thereby form a multilayer sheet; (g) inserting the multilayer sheet between two layers of another hollow cylindrical knitted metal wire net and forming the other hollow cylindrical knitted metal wire net into another flattened knitted metal wire net by pressurizing the other hollow cylindrical knitted metal wire net with the multilayer sheet inserted between the two layers in a thicknesswise direction of the multilayer sheet, to thereby form a sheet for the outer layer in which the expanded graphite of the still other expanded graphite sheet of the multilayer sheet and the solid lubricant of the coating layer formed on one surface of the expanded graphite sheet are filled in meshes of the other flattened knitted metal wire net and which is constituted by the expanded graphite of the still other expanded graphite sheet, the solid lubricant of the coating layer, and the other flattened knitted metal wire net integrated with the expanded graphite and the solid lubricant in mixed form, an occupying area ratio of a surface constituted by the other flattened knitted metal wire net on an outer surface where the surface constituted by the other flattened knitted metal wire net, a surface constituted by the expanded graphite of the still other expanded graphite sheet, and a surface constituted by the solid lubricant of the coating layer formed on one surface of the still other expanded graphite sheet are present in mixed form being 30 to 60%; (h) convoluting the sheet for the outer layer around an outer peripheral surface of the tubular base member in a state in which the outer surface of the sheet for the outer layer where the surface constituted by the other flattened knitted metal wire net, the surface constituted by the expanded graphite, and the surface constituted by the solid lubricant are present in mixed form is placed on an outer side, to thereby form a cylindrical preform; and (i) fitting the cylindrical preform over an outer peripheral surface of a core of a die, placing the core in the die, and subjecting the cylindrical preform to compression forming in the die in an axial direction of the core, wherein the spherical annular base member includes a reinforcing member for the spherical annular base member made from the compressed knitted metal wire net which is knitted by using the fine metal wire with the diameter of 0.28 to 0.32 mm and whose mesh size is 4 to 6 mm long and 3 to 5 mm wide and a heat-resistant material for the spherical annular base member containing the expanded graphite and compressed in such a manner as to fill the meshes of the knitted metal wire net of the reinforcing member and to be formed integrally with the reinforcing member in mixed form, wherein each of the partially convex spherical intermediate layers includes a reinforcing member for the partially convex spherical intermediate layer made from the compressed knitted metal wire net which is knitted by using the fine metal wire with the diameter of 0.10 to 0.20 mm and whose mesh size is 1.0 to 3.0 mm long and 0.5 to 2.5 mm wide and a heat-resistant material for the partially convex spherical intermediate layer containing the expanded graphite and compressed in such a manner as to fill the meshes of the knitted metal wire net of the reinforcing member for the partially convex spherical intermediate layer and to be formed integrally with the reinforcing member in mixed form, the occupying area ratio of the surface constituted by the reinforcing member for the partially convex spherical intermediate layer on the outer surface of each of the partially convex spherical intermediate layers being 30 to 60%, and wherein the outer layer includes a reinforcing member for the outer layer made from a compressed knitted metal wire net which is knitted by using a fine metal wire with a diameter of 0.10 to 0.20 mm and whose mesh size is 1.0 to 3.0 mm long and 0.5 to 2.5 mm wide, a solid lubricant consisting of a lubricating composition, and a heat-resistant material for the outer layer containing expanded graphite, the heat-resistant material for the outer layer and the solid lubricant being compressed in such a manner as to be filled in meshes of the metal wire net of the reinforcing member for the outer layer, an outer surface of the outer layer being formed into a smooth composite surface in which a surface constituted by the reinforcing member for the outer layer and a surface constituted by the solid lubricant are exposed in mixed form, the occupying area ratio of the surface constituted by the heat-resistant material for the outer layer on the outer surface of the outer layer being 30 to 60%.

According to the method of manufacturing a spherical annular seal member in accordance with the present invention, the sheet for the partially convex spherical intermediate layer is formed by inserting another expanded graphite sheet constituted by expanded graphite between two layers of a hollow cylindrical knitted metal wire net which is knitted by using a fine metal wire with a diameter of 0.10 to 0.20 mm and whose mesh size is 1.0 to 3.0 mm long and 0.5 to 2.5 mm wide, and by pressurizing the hollow cylindrical knitted metal wire net in the thicknesswise direction of the other expanded graphite sheet, such that the expanded graphite of the compressed other expanded graphite sheet is filled in the meshes of the flattened knitted metal wire net, the sheet for the partially convex spherical intermediate layer being thus constituted by the expanded graphite of the other expanded graphite sheet and the flattened knitted metal wire net integrated with that expanded graphite in mixed form, the occupying area ratio of the surface constituted by the flattened knitted metal wire net on the outer surface where the surface constituted by the flattened knitted metal wire net and the surface constituted by the expanded graphite of the other expanded graphite sheet are present in mixed form being 30 to 60%.

Since the partially convex spherical intermediate layers formed by convolution of this sheet for the partially convex spherical intermediate layer by at least two turns are laminated of the partially convex spherical surface of the spherical annular base member radially integrally in multilayer form, with the spherical annular seal member according to the manufacturing method in accordance with the present invention, even if the surface of sliding with the mating member has shifted to the partially convex spherical intermediate layer owing to the sliding friction with the mating member, the sliding with the mating member constantly takes place by the outer surface of the exposed partially convex spherical intermediate layer where the surface constituted by compressed knitted metal wire net serving as the reinforcing member and the surface constituted by the compressed expanded graphite serving as the heat-resistant material are present in mixed form, and the load applied to each of the heat-resistant material and reinforcing member for the partially convex spherical intermediate layer is reduced. As a result, even if very small oscillating motions or excessive axial loads are applied continuously for long periods of time, the possibility of causing damage such as sliding friction tracks on the surface of the mating member is minimal, and it is possible to prevent as practically as possible the coarsening of the mating member surface due to the damage. Hence, it is possible to prevent as practically as possible a decline in sealability between the partially convex spherical surface of the partially convex spherical intermediate layer and the mating member and prevent the generation of abnormal frictional noise as practically as possible.

In the method of manufacturing a spherical annular seal member in accordance with the present invention, each of the expanded graphite sheets may contain, in addition to expanded graphite, 1.0 to 16.0% by mass of a phosphate serving as an oxidation inhibitor, and may further contain therein 0.05 to 5.0% by mass of a phosphoric acid.

The coating layer on the one surface of the still other expanded graphite sheet serving as the outer layer may be formed by applying an aqueous dispersion onto that one surface by means of brushing, roller coating, spraying, or the like, the aqueous dispersion being one in which a hexagonal boron nitride powder and a polytetrafluoroethylene resin powder are dispersedly contained in an alumina sol in which hydrated alumina particles are dispersedly contained in water containing an acid as a dispersion medium and whose hydrogen ion concentration (pH) exhibits 2 to 3, the aqueous dispersion dispersedly containing as a solid content 30 to 50% by mass of the lubricating composition containing 23 to 57% by mass of the hexagonal boron nitride powder, 33 to 67% by mass of the polytetrafluoroethylene resin powder, and 5 to 15% by mass of hydrated alumina.

Advantages of the Invention

According to the present invention, even if the outer layer is worn away and lost due to the sliding friction with the mating member, and the sliding friction has shifted to that between the mating member and the partially convex spherical intermediate layer, since each of the plurality of partially convex spherical intermediate layers includes the reinforcing member for the partially convex spherical intermediate layer made from the knitted metal wire net which is knitted by using a fine metal wire with a diameter of 0.10 to 0.20 mm and whose mesh size is 1.0 to 3.0 mm long and 0.5 to 2.5 mm wide and the heat-resistant material for the partially convex spherical intermediate layer containing expanded graphite and compressed in such a manner as to fill the meshes of the knitted metal wire net of this reinforcing member and to be formed integrally with that reinforcing member in mixed form, and since the occupying area ratio of the surface constituted by the reinforcing member for the partially convex spherical intermediate layer on the outer surface of each of the partially convex spherical intermediate layers is 30 to 60%, the sliding with the mating member constantly takes place by the exposed outer surface where the surface constituted by the reinforcing member for the partially convex spherical intermediate layer and the surface constituted by the heat-resistant material for the partially convex spherical intermediate layer are present in mixed form, and the load applied to each of the heat-resistant material and reinforcing member for the partially convex spherical intermediate layer is reduced. As a result, even if very small oscillating motions or excessive axial loads are applied continuously for long periods of time, the possibility of causing damage such as sliding friction tracks on the surface of the mating member is minimal, and it is possible to prevent as practically as possible the coarsening of the mating member surface due to the damage. Hence, it is possible to provide a spherical annular seal member which is capable of preventing as practically as possible a decline in sealability between the partially convex spherical surface of the partially convex spherical intermediate layer and the mating member and of preventing the generation of abnormal frictional noise as practically as possible, and a method of manufacturing the same.

MODE FOR CARRYING OUT THE INVENTION

Figure 1:
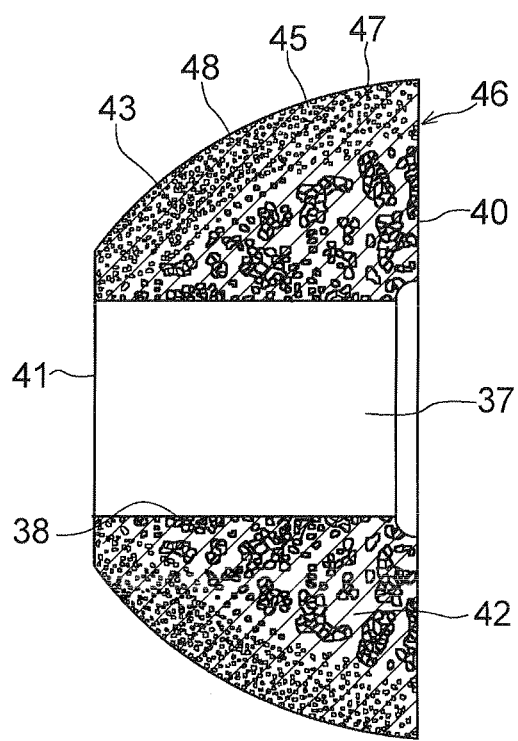
FIG. 1 is an explanatory cross-sectional view of an embodiment of a spherical annular seal member in accordance with the present invention.

Next, a more detailed description will be given of the present invention on the basis of the embodiments illustrated in the drawings. It should be noted that the present invention is not limited to these embodiments.

A description will be given of constituent materials of a spherical annular seal member and a method of manufacturing the spherical annular seal member in accordance with the invention.

<Expanded Graphite Sheet I and Manufacturing Method Thereof>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., and natural flake graphite powder having a particle size of 30 to 80 meshes is added to the reaction solution to effect reaction for a predetermined time. After the reaction, acid-treated graphite powder is separated by suction filtration, and an operation is repeated twice in which the acid-treated graphite powder is agitated in water, to thereby sufficiently remove the sulfuric acid content from the acid-treated graphite powder. Then, the acid-treated graphite powder with the sulfuric acid content sufficiently removed is dried in a drying furnace for a predetermined time, and this is used as an acid-treated graphite powder.

The above-described acid-treated graphite powder is subjected to heating (expansion) treatment for 1 to 10 seconds at temperatures of 960 to 1200° C. to produce cracked gas. The gaps between graphite layers are expanded by its gas pressure to form expanded graphite particles (expansion rate: 240 to 300 times). These expanded graphite particles are fed to a twin roller apparatus adjusted to a desired roll nip and is subjected to roll forming, thereby fabricating an expanded graphite sheet I having a desired thickness.

<Expanded Graphite Sheet II and Manufacturing Method Thereof>

While acid-treated graphite powder obtained in a method similar to that for the above-described acid-treated graphite powder is being agitated, a solution in which an aqueous solution of, for example, aluminum primary phosphate [Al(H$_2$PO$_4$)$_3$] of a 50% concentration as a phosphate is diluted with methanol is compounded with that acid-treated graphite powder by spraying, and is agitated uniformly to fabricate a mixture having wettability. This mixture having wettability is dried in a drying furnace for a predetermined time. Then, this dried mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). In this expansion treatment process, water in the structural formula of aluminum primary phosphate is eliminated. These expanded graphite particles are fed to the twin roller apparatus adjusted to a desired roll nip and is subjected to roll forming, thereby fabricating an expanded graphite sheet II having a desired thickness.

<Expanded Graphite Sheet III and Manufacturing Method Thereof>

While acid-treated graphite powder obtained in a method similar to that for the above-described acid-treated graphite powder is being agitated, a solution in which an aqueous solution of, for instance, aluminum primary phosphate of a 50% concentration as a phosphate and an aqueous solution of, for instance, orthophosphoric acid (H$_3$PO$_4$) of a 84% concentration as a phosphoric acid are diluted with methanol is compounded with that acid-treated graphite powder by spraying, and is agitated uniformly to fabricate a mixture having wettability. This mixture having wettability is dried in a drying furnace for a predetermined time. Then, this dried mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). In this expansion treatment process, water in the structural formula of aluminum primary phosphate is eliminated, and the orthophosphoric acid undergoes dehydration reaction to produce phosphorus pentoxide. These expanded graphite particles are fed to the twin roller apparatus adjusted to a desired roll nip and is subjected to roll forming, thereby fabricating an expanded graphite sheet III having a desired thickness.

In the expanded graphite sheet III thus fabricated, aluminum primary phosphate is preferably contained at a ratio of 1.0 to 16.0% by mass. In the expanded graphite sheet III, aluminum primary phosphate and phosphorus pentoxide are preferably contained at a ratio of 1.0 to 16.0% by mass and at a ratio of 0.05 to 5.0% by mass, respectively. This expanded graphite containing the phosphate or the phosphate and phosphorus pentoxide permits use at, for instance, 600° C. or a high-temperature range exceeding 600° C. since the heat resistance of the expanded graphite itself is improved and the oxidation inhibiting action is imparted thereto. Here, as the phosphate, it is possible to use, in addition to the aforementioned aluminum primary phosphate, lithium primary phosphate (LiH$_2$PO$_4$), lithium secondary phosphate (Li$_2$HPO$_4$), calcium primary phosphate [Ca(H$_2$PO$_4$)$_2$], calcium secondary phosphate (CaHPO$_4$), aluminum secondary phosphate [Al$_2$(HPO$_4$)$_2$], and the like. As the phosphoric acid, it is possible to use metaphosphoric acid (HPO$_3$), polyphosphoric acid, and the like, in addition to the aforementioned orthophosphoric acid.

In the above-described expanded graphite sheets I, II, and III, their density is suitably 1.0 to 1.5 Mg/m$^3$, preferably 1.0 to 1.2 Mg/m$^3$, and their thickness is suitably 0.30 to 0.60 mm.

<Concerning Knitted Metal Wire Net>

A knitted metal wires net is suitably formed by knitting one or more fine metal wires including, as an iron-based wire, a stainless steel wire made of such as austenitic stainless steels SUS 304, SUS 310S, and SUS 316, a ferritic stainless steel SUS 430, or an iron wire (JIS G 3532) or a zinc-coated steel wire (JIS G 3547), or, as a copper-based wire, a copper-nickel alloy (cupro-nickel) wire, a copper-nickel-zinc alloy (nickel silver) wire, a brass wire, or a beryllium copper wire.

Figure 5:
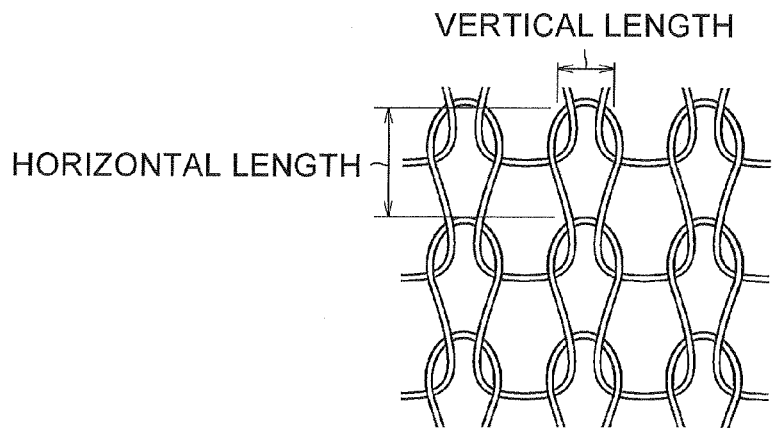
FIG. 5 is an explanatory plan view of meshes of a knitted metal wire net in the process of manufacturing the spherical annular seal member in accordance with the present invention.

As the knitted metal wire net for a spherical annular base member, a fine metal wire whose diameter is 0.28 to 0.32 mm is suitably used. In terms of the mesh size of the knitted metal wire net formed by the fine metal wire of that diameter, a mesh size of 4 to 6 mm long and 3 to 5 mm wide or thereabouts is suitable, as shown in FIG. 5. Meanwhile, as the knitted metal wire nets for a partially convex spherical intermediate layer and for an outer layer, a fine metal wire whose diameter is 0.10 to 0.20 mm is suitably used. In terms of the mesh size of the knitted metal wire net formed by the fine metal wire of that diameter, a mesh size of 1.0 to 3.0 mm long and 0.5 to 2.5 mm wide or thereabouts is suitable, as shown in FIG. 5.

<Concerning Solid Lubricant>

As a solid lubricant, it is possible to illustrate as a preferred example a lubricating composition which contains 23 to 57% by mass of a hexagonal boron nitride (hereinafter abbreviated as "h-BN"), 5 to 15% by mass of hydrated alumina, and 33 to 67% by mass of a polytetrafluoroethylene resin (hereinafter referred to as "PTFE").

In the manufacturing process, this solid lubricant is used in the form of an aqueous dispersion in which an h-BN powder and a PTFE powder are dispersedly contained in an alumina sol in which hydrated alumina particles are dispersedly contained in water containing an acid as a dispersion medium and whose hydrogen ion concentration (pH) exhibits 2 to 3, the aqueous dispersion dispersedly containing as a solid content 30 to 50% by mass of a lubricating composition containing 23 to 57% by mass of the h-BN powder, 33 to 67% by mass of the PTFE powder, and 5 to 15% by mass of hydrated alumina. The h-BN powder and the PTFE powder for forming the aqueous dispersion are preferably as fine powders as possible, and fine powders with an average particle size of 10 μm or less, more preferably 0.5 μm or less, are suitably used as these powders.

The hydrated alumina for forming the alumina sol in the aqueous dispersion is a compound which is expressed by a composition formula: $Al_2O_3 \cdot nH_2O$ (in the composition formula, $0<n<3$). In the compound, n is normally a number exceeding 0 (zero) and less than 3, preferably 0.5 to 2, more preferably 0.7 to 1.5 or thereabouts. As the hydrated alumina, it is possible to cite, for example, alumina monohydrate (aluminum hydroxide oxide) such as boehmite ($Al_2O_3 \cdot H_2O$) and diaspore ($Al_2O_3 \cdot H_2O$), alumina trihydrate such as gibbsite ($Al_2O_3 \cdot 3H_2O$) and bayerite ($Al_2O_3 \cdot 3H_2O$), pseudoboehmite, and the like.

Next, referring to the drawings, a description will be given of a method of manufacturing a spherical annular seal member composed of the above-described constituent materials.

Figure 3:
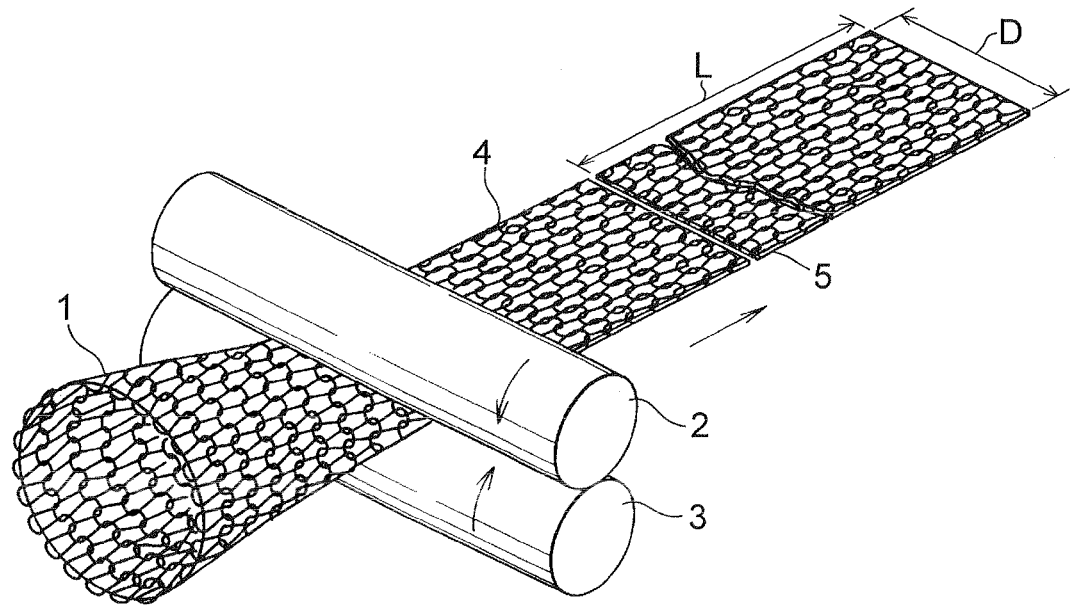
FIG. 3 is an explanatory perspective view of a knitted metal wire net in the process of manufacturing the spherical annular seal member in accordance with the present invention.

(First Process) As shown in FIG. 3, a hollow cylindrical knitted metal wire net 1, which is formed by knitting a fine metal wire with a diameter of 0.28 to 0.32 mm into a cylindrical shape and whose mesh size is 4 to 6 mm long and 3 to 5 mm wide or thereabouts (see FIG. 5), is passed between rollers 2 and 3 so as to be pressurized, thereby fabricating a belt-shaped knitted metal wire net 4 having a predetermined width D. A knitted metal wire net 5 for a spherical annular base member is then prepared by cutting the knitted metal wire net 4 into a predetermined length L.

Figure 4:
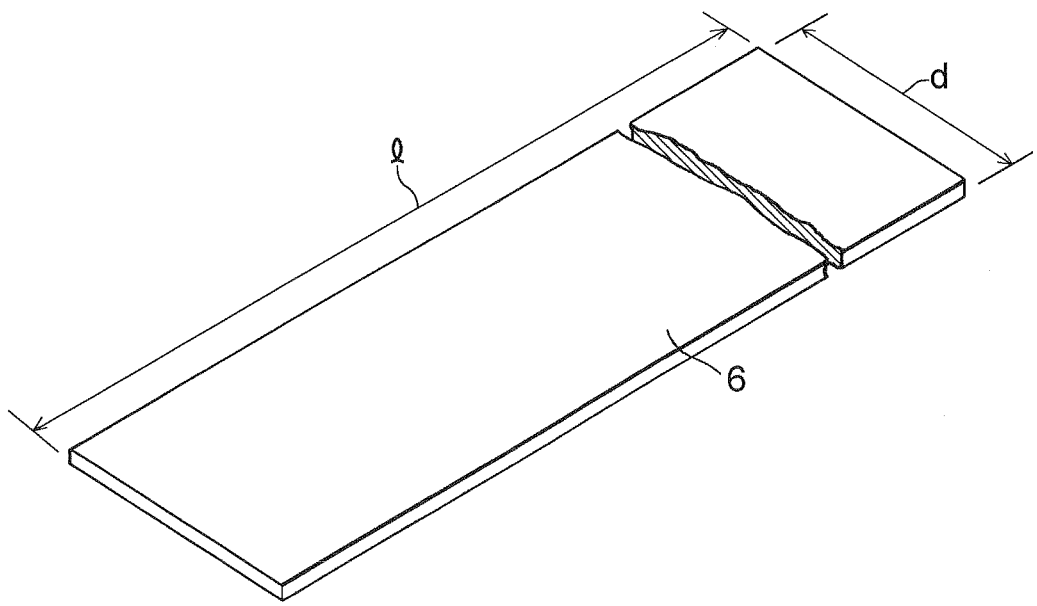
FIG. 4 is an explanatory perspective view of an expanded graphite sheet in the process of manufacturing the spherical annular seal member in accordance with the present invention.

(Second Process) As shown in FIG. 4, an expanded graphite sheet 6 (composed of one of the expanded graphite sheet I, the expanded graphite sheet II, and the expanded graphite sheet III) is prepared which has a width d of from 1.10×D to 2.1×D with respect to the width D of the knitted metal wire net 5, a length l of from 1.30×L to 2.7×L with respect to the length L of the knitted metal wire net 5, a density of 1.0 to 1.5 Mg/m³, preferably 1.0 to 1.2 Mg/m³, and a thickness of 0.30 to 0.60 mm.

Figure 6:
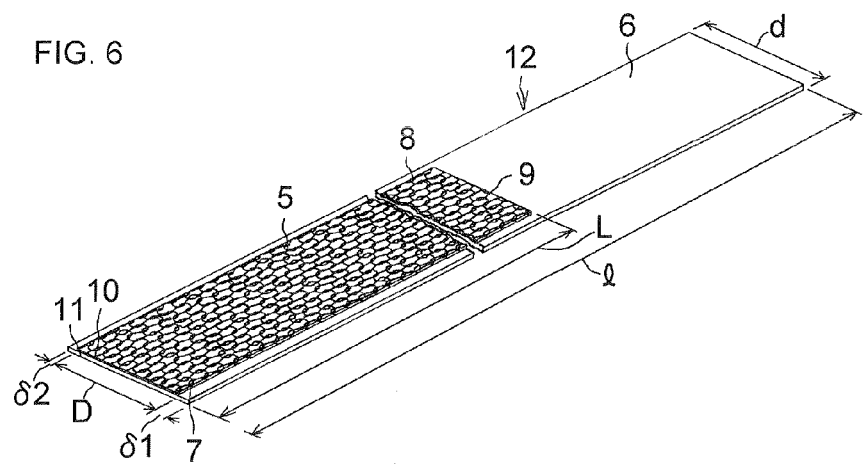
FIG. 6 is an explanatory perspective view of a superposed assembly in the process of manufacturing the spherical annular seal member in accordance with the present invention.

(Third Process) A superposed assembly 12 in which the expanded graphite sheet 6 and the knitted metal wire net 5 are superposed one on top of the other is prepared as follows: To ensure that the expanded graphite of the expanded graphite sheet 6 is wholly exposed on a large-diameter side annular end face 40 and a small-diameter side annular end face 41 of a partially convex spherical surface 39 in a below-described spherical annular seal member 46 (see FIG. 1), as shown in FIG. 6, the expanded graphite sheet 6 is made to project in the widthwise direction by a maximum of 0.1×D to 0.3×D from one widthwise end 7 of the knitted metal wire net 5, which serves as the large-diameter side annular end face 40 of a partially convex spherical surface 44. Also, the amount of widthwise projection, δ1, of the expanded graphite sheet 6 from the end 7 is made greater than the amount of its widthwise projection, δ2, from the other widthwise end 8 of the knitted metal wire net 5, which serves as the small-diameter side annular end face 41 of the partially convex spherical surface 44. Further, the expanded graphite sheet 6 is made to project in the longitudinal direction by a maximum of 1.3×L to 2.7×L from one longitudinal end 9 of the knitted metal wire net 5, while the other longitudinal end 10 of the knitted metal wire net 5 and a longitudinal end 11 of the expanded graphite sheet 6 corresponding to that end 10 are matched.

Figure 7:
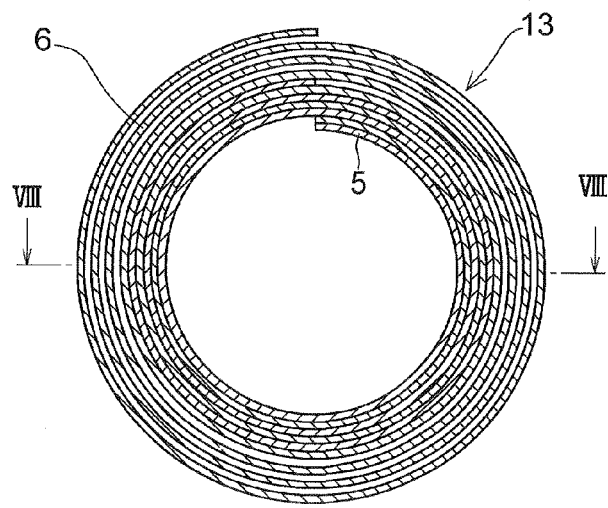
FIG. 7 is an explanatory plan view of a tubular base part in the process of manufacturing the spherical annular seal member in accordance with the present invention.
Figure 8:
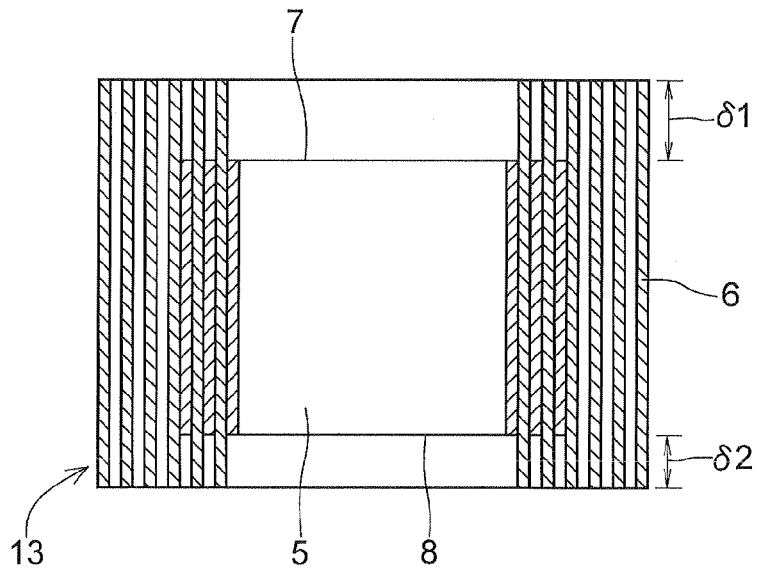
FIG. 8 is an explanatory cross-sectional view, taken in the direction of arrows VIII-VIII, of the tubular base part shown in FIG. 7.

(Fourth Process) As shown in FIG. 7, the superposed assembly 12 is convoluted with the knitted metal wire net 5 placed on the inner side such that expanded graphite sheet 6 is convoluted with three more turns, thereby forming a tubular base part 13 in which the knitted metal wire net 5 is exposed on the inner peripheral side and the expanded graphite sheet 6 is exposed on the outer peripheral side. As the expanded graphite sheet 6, one is prepared in advance which has a length l of from 1.3×L to 2.7×L with respect to the length L of the knitted metal wire net 5 so that the number of winding turns of the expanded graphite sheet 6 in the tubular base part 13 becomes greater than the number of winding turns of the knitted metal wire net 5. In the tubular base part 13, as shown in FIG. 8, the expanded graphite sheet 6 on its one widthwise end side projects in the widthwise direction by δ1 from the one end 7 of the knitted metal wire net 5, and the expanded graphite sheet 6 on its other widthwise end side projects in the widthwise direction by δ2 from the other end 8 of the knitted metal wire net 5.

Figure 10:
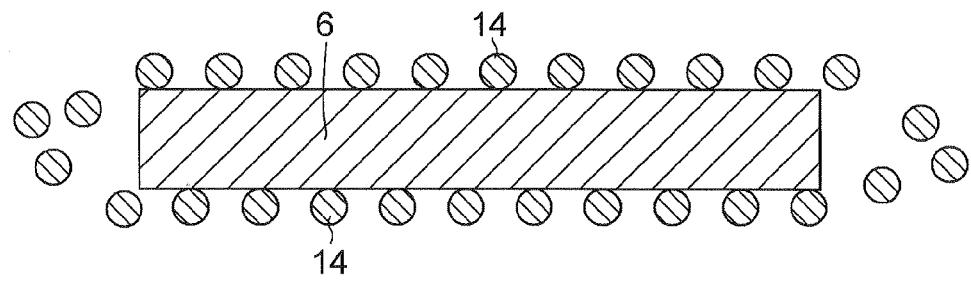
FIG. 10 is an explanatory cross-sectional view of the process of manufacturing the partially convex spherical intermediate layer in the process of manufacturing the spherical annular seal member in accordance with the present invention.
Figure 11:
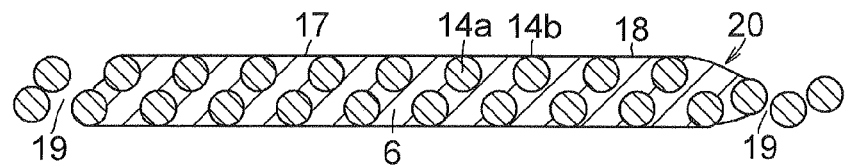
FIG. 11 is an explanatory cross-sectional view of the partially convex spherical intermediate layer in the process of manufacturing the spherical annular seal member in accordance with the present invention.

(Fifth Process) Between two layers, i.e., an interior, of a hollow cylindrical knitted metal wire net 14 for a partially convex spherical intermediate layer, which is obtained by continuously knitting a fine metal wire with a diameter of 0.10 to 0.20 mm by a knitting machine (not shown) and whose mesh size is 1.0 to 3.0 mm long and 0.5 to 2.5 mm wide (see FIG. 5), an expanded graphite sheet 6 formed with a length (width) smaller than the length of the diameter (inside diameter) of that knitted metal wire net 14 is continuously inserted. The knitted metal wire net 14 with the expanded graphite sheet 6 inserted therein is fed, starting with its insertion start end, into a nip Δ1 between cylindrical rollers 15 and 16 (see FIG. 9) each having a smooth cylindrical outer peripheral surface and is thereby pressurized in the thicknesswise direction of the expanded graphite sheet 6 (see FIGS. 10 and 11), thereby forming a flattened knitted metal wire net 14a. The flattened knitted metal wire net 14a and the expanded graphite sheet 6 are thus pressure bonded to each other such that the expanded graphite of the expanded graphite sheet 6 is filled in the meshes of the flattened knitted metal wire net 14a, and portions of the knitted metal wire net 14a are exposed on an outer surface 17 together with a surface 18 constituted by the expanded graphite of the expanded graphite sheet 6, while the other portions of the knitted metal wire net 14a are embedded in the expanded graphite of the expanded graphite sheet 6. Thus, a sheet 20 for a partially convex spherical intermediate layer (see FIG. 11) is fabricated in which the occupying area ratio of a surface 14b constituted by the knitted metal wire net 14a on the outer surface 17 is 30 to 60%, and the surface 14b constituted by the knitted metal wire net 14a and the surface 18 constituted by the expanded graphite of the expanded graphite sheet 6 are present on the outer surface 17 in mixed form, while portions 19 which are not filled with the expanded graphite of the expanded graphite sheet 6 are present on both widthwise sides of the knitted metal wire net 14a.

Figure 12:
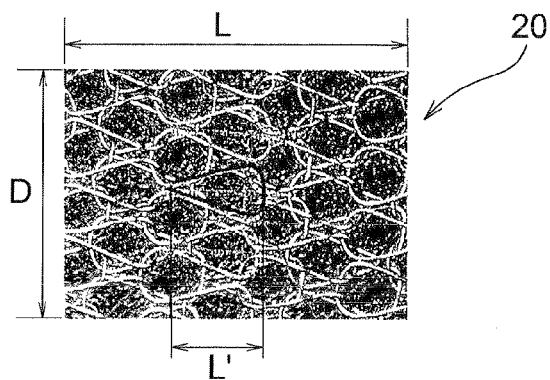
FIG. 12 is an explanatory plan view in the form of a photograph of the partially convex spherical intermediate layer in the process of manufacturing the spherical annular seal member in accordance with the present invention.

Here, the occupying area ratio of the surface 14b constituted by the knitted metal wire net 14a on the outer surface 17 may be determined as follows: Referring to FIG. 12 illustrating the plane surface (plan view in form of a photograph) of the sheet 20 for the partially convex spherical intermediate layer, an area S1 of fine metal wire portions in an area of a measurement range (length L×width D=S0) is calculated from: (the number of one half of the number of meshes of the hollow cylindrical knitted metal wire net 14 in the circumferential direction)×(the number of meshes with a longitudinal mesh size L' of the knitted metal wire net 14a, which are present in the measurement range (length L and width D) of the sheet 20 for the partially convex spherical intermediate layer)×(the length of the fine metal wire of the knitted metal wire net 14a forming one mesh with that mesh size L')×(the diameter of that fine metal wire). The ratio (S1/S0×100) of the area S1 of the fine metal wire portions occupied in the area of the measurement range (length L×width D=S0) is set as the occupying area ratio. For example, if it is assumed that the number of meshes of the knitted metal wire net 14 in the circumferential direction is 56, that the length L of the measurement range of the sheet 20 for the partially convex spherical intermediate layer is 20 mm, that the width D of the measurement range of the sheet 20 for the partially convex spherical intermediate layer is 39 mm, that the longitudinal mesh size L' of one mesh of the knitted metal wire net 14a is 2.01 mm, that the length of the fine metal wire forming that one mesh is 6.43 mm, and that the diameter of that fine metal wire is 0.15 mm, then the area S0 of the measurement range is 780 mm$^2$ (=20 mm×39 mm), and the area of the fine metal wire portions in the measurement range is 56/2×(20/2.01)× 6.43×0.15=28×9.95×6.43×0.15=268.7 mm$^2$, so that the ratio of the area of these metal wire net portions in the unit area becomes 7/780×100=34.4%. Accordingly, in this sheet 20 for the partially convex spherical intermediate layer, the occupying area ratio of the surface 14b constituted by the knitted metal wire net 14a in the outer surface 17 becomes 34.4%. It should be noted that, with respect to a plurality of measurement ranges of the outer surface 17, the longitudinal mesh size U of the knitted metal wire net 14a in the sheet 20 for the partially convex spherical intermediate layer and the length of the fine metal wire forming one mesh with the mesh size L' may be respectively measured by a microscope, and the occupying area ratio may be determined from an arithmetic mean value of the occupying area ratios of the respective measurement ranges obtained by calculation from the measured values.

The fact that, in the sheet 20 for the partially convex spherical intermediate layer, the occupying area ratio of the surface 14b constituted by the knitted metal wire net 14a on the outer surface 17 is set to 30 to 60%, preferably 30 to 45%, produces the effect that although abrasion occurs on the surface 14b constituted by the exposed knitted metal wire net 14a on the outer surface 17 due to sliding friction with the mating member and the occupying area ratio of the surface 14b constituted by the knitted metal wire net 14a increases gradually depending on the amount of abrasion, if the occupying area ratio of the surface 14b constituted by the knitted metal wire net 14a exposed on the outer surface 17 is 30 to 60%, the load applied to each of the expanded graphite sheet 6 and the knitted metal wire net 14a in the sliding friction with the mating member is reduced, with the result that even if very small oscillating motions or excessive axial loads are applied continuously for long periods of time, it is possible to prevent as practically as possible the generation of abnormal frictional noise without causing damage to the mating member.

The nip Δ1 between the cylindrical rollers 15 and 16 in the fifth process is preferably set in a range of 0.35 to 0.60 mm.

Figure 13:
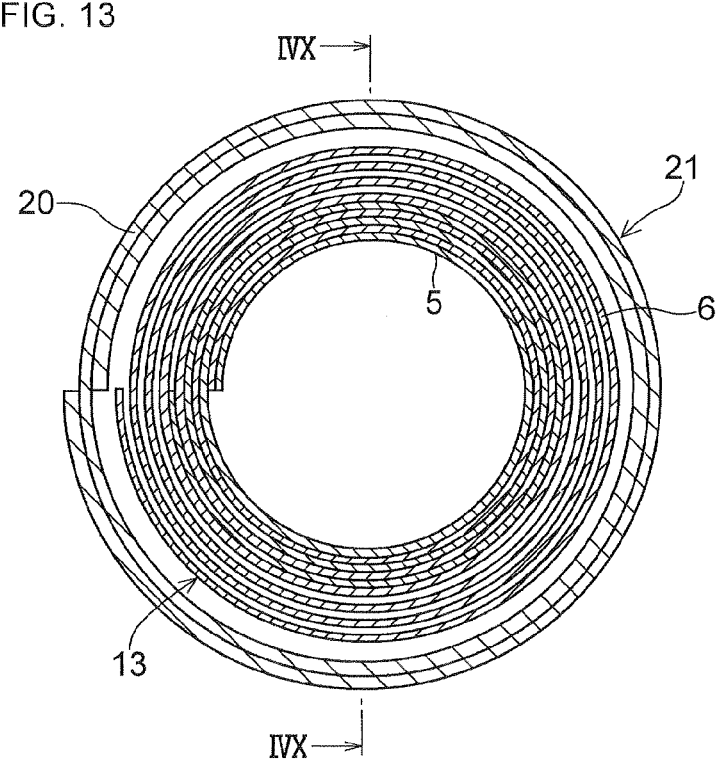
FIG. 13 is an explanatory plan view of a tubular base member in the process of manufacturing the spherical annular seal member in accordance with the present invention.
Figure 14:
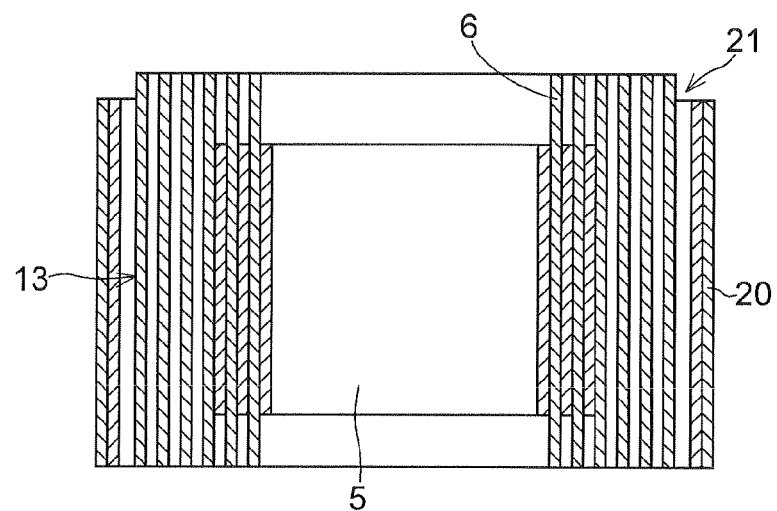
FIG. 14 is an explanatory cross-sectional view, taken in the direction of arrows IVX-IVX, of the tubular base member shown in FIG. 13.

(Sixth Process) A tubular base member 21 is fabricated by convoluting the sheet 20 for the partially convex spherical intermediate layer by at least two turns around the outer peripheral surface of the aforementioned tubular base part 13 (see FIGS. 13 and 14).

(Seventh Process)

<Sheet for the Outer Layer and Manufacturing Method Thereof>

An aqueous dispersion is prepared in which an h-BN powder and a PTFE powder are dispersedly contained in an alumina sol in which hydrated alumina particles are dispersedly contained in water serving as a dispersion medium containing nitric acid acting as a deflocculant and whose hydrogen ion concentration (pH) exhibits 2 to 3, the aqueous dispersion dispersedly containing as a solid content 30 to 50% by mass of a lubricating composition containing 23 to 57% by mass of h-BN, 33 to 67% by mass of PTFE, and 5 to 15% by mass of hydrated alumina.

Figure 15:
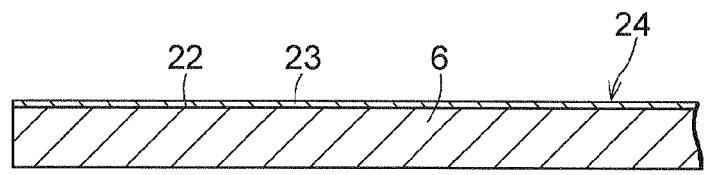
FIG. 15 is an explanatory cross-sectional view of a multilayer sheet having a coating layer in the process of manufacturing the spherical annular seal member in accordance with the present invention.

An expanded graphite sheet 6 similar to the aforementioned expanded graphite sheet 6 is separately prepared, and the aqueous dispersion dispersedly containing as a solid content 30 to 50% by mass of a lubricating composition containing 23 to 57% by mass of h-BN, 33 to 67% by mass of PTFE, and 5 to 15% by mass of hydrated alumina is applied to one surface 22 of the expanded graphite sheet 6 by means of brushing, roller coating, spraying, or the like, and this was dried to thereby fabricate a multilayer sheet 24 (see FIG. 15) on which a coating layer 23 of the solid lubricant consisting of the lubricating composition has been formed.

Figure 9:
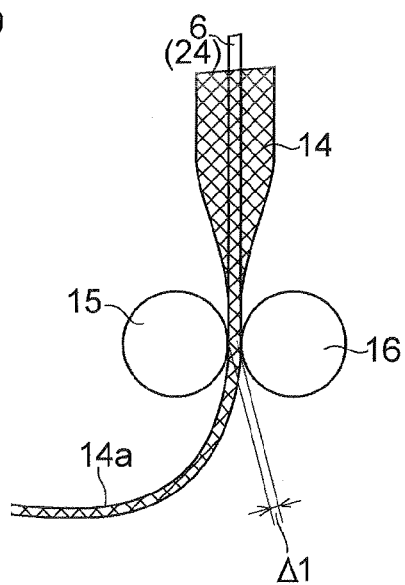
FIG. 9 is an explanatory diagram of the process of manufacturing a partially convex spherical intermediate layer in the process of manufacturing the spherical annular seal member in accordance with the present invention.
Figure 16:
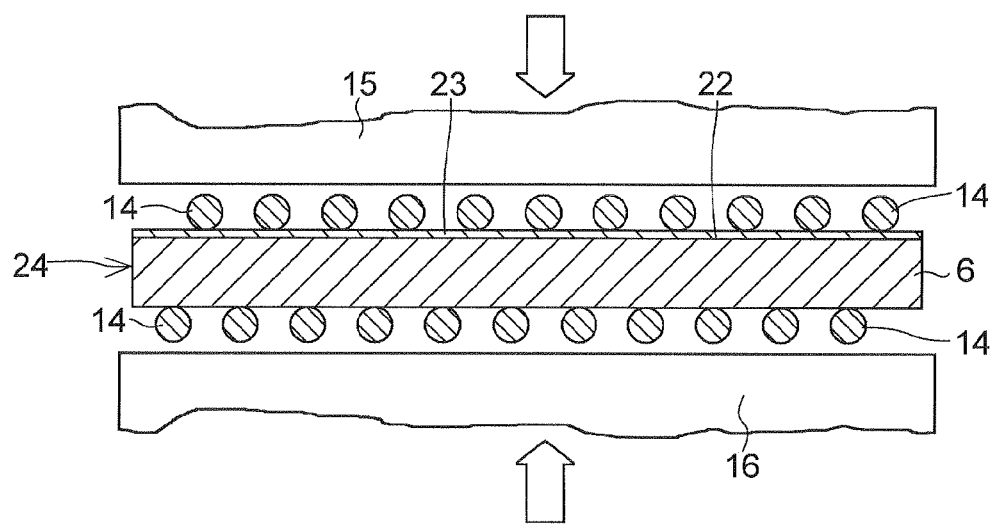
FIG. 16 is an explanatory diagram of the process of manufacturing a sheet for an outer layer in the process of manufacturing the spherical annular seal member in accordance with the present invention.
Figure 17:
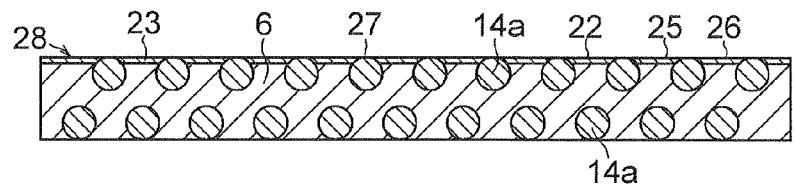
FIG. 17 is an explanatory cross-sectional view of the sheet for the outer layer in the process of manufacturing the spherical annular seal member in accordance with the present invention.

Between two layers, i.e., the interior, of the hollow cylindrical knitted metal wire net 14, which is similar to the hollow cylindrical knitted metal wire net 14 for the partially convex spherical intermediate layer and is formed by knitting a fine metal wire with a diameter of 0.10 to 0.20 mm into a cylindrical shape and whose mesh size is 1.0 to 3.0 mm long and 1.0 to 2.5 mm wide, the multilayer sheet 24 having the coating layer 23 of the solid lubricant formed with a length (width) smaller than the length of the diameter (inside diameter) of that knitted metal wire net 14 is continuously inserted (see FIG. 9). The knitted metal wire net 14 with the multilayer sheet 24 inserted therein is fed, starting with its insertion start end, into the nip Δ1 between the pair of cylindrical rollers 15 and 16 each having a smooth outer peripheral surface and is thereby pressurized in the thicknesswise direction of the multilayer sheet 24 (see FIGS. 9, 16, and 17), thereby forming the flattened knitted metal wire net 14a. The multilayer sheet 24 and the knitted metal wire net 14a are thus pressure bonded to each other so as to be integrated such that the expanded graphite of the expanded graphite sheet 6 of the multilayer sheet 24 and the solid lubricant of the coating layer 23 coating the surface 22 of that expanded graphite sheet 6 are filled in the meshes of the knitted metal wire net 14a, and portions of the knitted metal wire net 14a are exposed on an outer surface 25 together with a surface 26 constituted by the solid lubricant of the coating layer 23, while the other portions of the knitted metal wire net 14a are embedded in the solid lubricant of the coating layer 23 and in the expanded graphite of the expanded graphite sheet 6. Thus, a sheet 28 for the outer layer (see FIG. 17) is fabricated in which the occupying area ratio of a surface 27 constituted by the knitted metal wire net 14a on the outer surface 25 is 30 to 60%, and the surface 27 constituted by the knitted metal wire net 14a and the surface 26 constituted by the solid lubricant are exposed on the outer surface 25 in mixed form.

The fact that, in the sheet 28 for the outer layer as well, the occupying area ratio of the surface 27 constituted by the knitted metal wire net 14a on the outer surface 25 is set to 30 to 60%, preferably 30 to 45%, produces the effect that although abrasion occurs on the surface 27 constituted by the exposed knitted metal wire net 14a on the outer surface 25 due to sliding friction with the mating member and the occupying area ratio of the surface 27 constituted by the knitted metal wire net 14a increases gradually depending on the amount of abrasion, if the occupying area ratio of the surface 27 constituted by the knitted metal wire net 14a exposed on the outer surface 25 is 30 to 60%, the load applied to each of the expanded graphite sheet 6 and the knitted metal wire net 14a in the sliding friction with the mating member is reduced, with the result that even if very small oscillating motions or excessive axial loads are applied continuously for long periods of time, it is possible to prevent as practically as possible the generation of abnormal frictional noise without causing damage to the mating member.

The occupying area ratio of the surface 27 constituted by the knitted metal wire net 14a on the outer surface 25 is determined in the same way as the above-described determination of the occupying area ratio of the surface 14b constituted by the knitted metal wire net 14a on the outer surface 17.

The nip Δ1 between the cylindrical rollers 15 and 16 in the seventh process is preferably set in the range of 0.35 to 0.60 mm.

Figure 18:
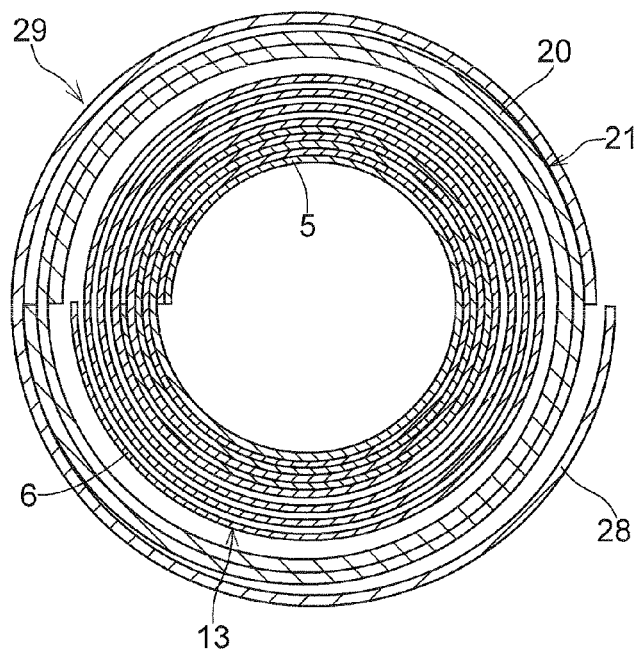
FIG. 18 is an explanatory plan view of a cylindrical preform in the process of manufacturing the spherical annular seal member in accordance with the present invention.

(Eighth Process) The sheet 28 for the outer layer thus obtained is wound around an outer peripheral surface of the aforementioned tubular base member 21 in a state in which the surface 25 where the solid lubricant is exposed is placed on the outer side, thereby fabricating a cylindrical preform 29 (see FIG. 18).

Figure 19:
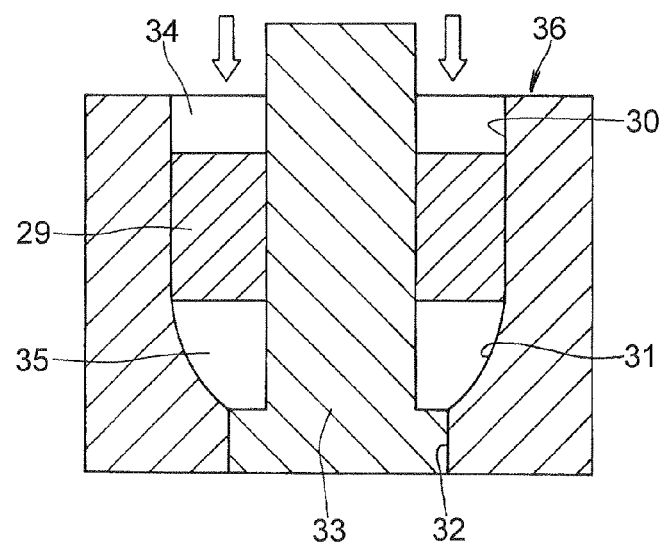
FIG. 19 is an explanatory cross-sectional view of a state in which the cylindrical preform is disposed in a die in the process of manufacturing the spherical annular seal member in accordance with the present invention.

(Ninth Process) A die 36 such as the one shown in FIG. 19 is prepared which has on its inner surface a cylindrical inner wall surface 30, a partially concave spherical wall surface 31 continuing from the cylindrical inner wall surface 30, and a through hole 32 continuing from the partially concave spherical wall surface 31, and in which a hollow cylindrical portion 34 and a spherical annular hollow portion 35 continuing from the hollow cylindrical portion 34 are formed inside it as a stepped core 33 is fittingly inserted in the through hole 32. Then, the cylindrical preform 29 is fitted over the stepped core 33 of the die 36.

The cylindrical preform 29 disposed in the hollow cylindrical portion 34 and the spherical annular hollow portion 35 of the die 36 is subjected to compression forming under a pressure of 98 to 294 N/mm² (1 to 3 tons/cm²) in the direction of the core axis. Thus, the spherical annular seal member 46 is fabricated which includes: a spherical annular base member 42 defined by a cylindrical inner surface 38 defining a through hole 37 in a central portion, the partially convex spherical surface 39, and the large- and small-diameter side annular end faces 40 and 41 of the partially convex spherical surface 39; a plurality of partially convex spherical intermediate layers 43 formed integrally on the partially convex spherical surface 39 of the spherical annular base member 42 and laminated in the radial direction; and an outer layer 45 formed integrally on the partially convex spherical surface 44 of the outermost partially convex spherical intermediate layer 43 of these partially convex spherical intermediate layers 43, as shown in FIG. 1 and FIG. 2.

Figure 2:
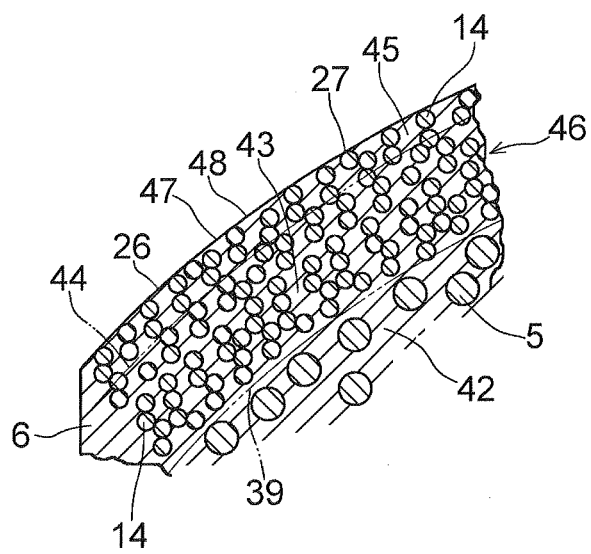
FIG. 2 is a partially enlarged schematic diagram of the spherical annular seal member shown in FIG. 1.

In the spherical annular seal member 46, as shown in FIG. 1 and FIG. 2, the spherical annular base member 42 includes a reinforcing member for the spherical annular base member made from the compressed knitted metal wire net 5 which is knitted by using a fine metal wire with a diameter of 0.28 to 0.32 mm and whose mesh size is 4 to 6 mm long and 3 to 5 mm wide and a heat-resistant material containing the expanded graphite of the expanded graphite sheet 6 compressed in such a manner as to fill the meshes of the knitted metal wire net 5 of this reinforcing member and to be formed integrally with the knitted metal wire net 5 of this reinforcing member in mixed form. Each of the partially convex spherical intermediate layers 43 includes a reinforcing member for the partially convex spherical intermediate layer made from the compressed knitted metal wire net 14 which is knitted by using a fine metal wire with a diameter of 0.10 to 0.20 mm and whose mesh size is 1.0 to 3.0 mm long and 0.5 to 2.5 mm wide and a heat-resistant material for the partially convex spherical intermediate layer containing the expanded graphite of the expanded graphite sheet 6 compressed in such a manner as to fill the meshes of the knitted metal wire net 14 of this reinforcing member and to be formed integrally with the knitted metal wire net 14 in mixed form. The occupying area ratio of the surface constituted by the compressed knitted metal wire net 14 of the reinforcing member for the partially convex spherical intermediate layer on the outer surface of each of the partially convex spherical intermediate layers 43 is 30 to 60%. As for the outer layer 45, a reinforcing member for the outer layer made from the knitted metal wire net 14 similar to the knitted metal wire net 14 for the partially convex spherical intermediate layer, a solid lubricant consisting of a lubricating composition, and a heat-resistant material for the outer layer constituted by the expanded graphite sheet 6 containing expanded graphite are compressed such that meshes of the knitted metal wire net 14 of the heat-resistant material for the outer layer are filled with the solid lubricant and the expanded graphite of the expanded graphite sheet 6 of the heat-resistant material for the outer layer. A spherical annular outer surface 47 of the outer layer 45 is formed into a smooth composite surface 48 in which the surface 27 constituted by the knitted metal wire net 14 of the reinforcing member for the outer layer and the surface 26 constituted by the solid lubricant are exposed in mixed form. On the outer surface 47 of the outer layer 45, the occupying area ratio of the surface 27 constituted by the knitted metal wire net 14 of the reinforcing member of the outer layer 45 is 30 to 60%.

Figure 20:
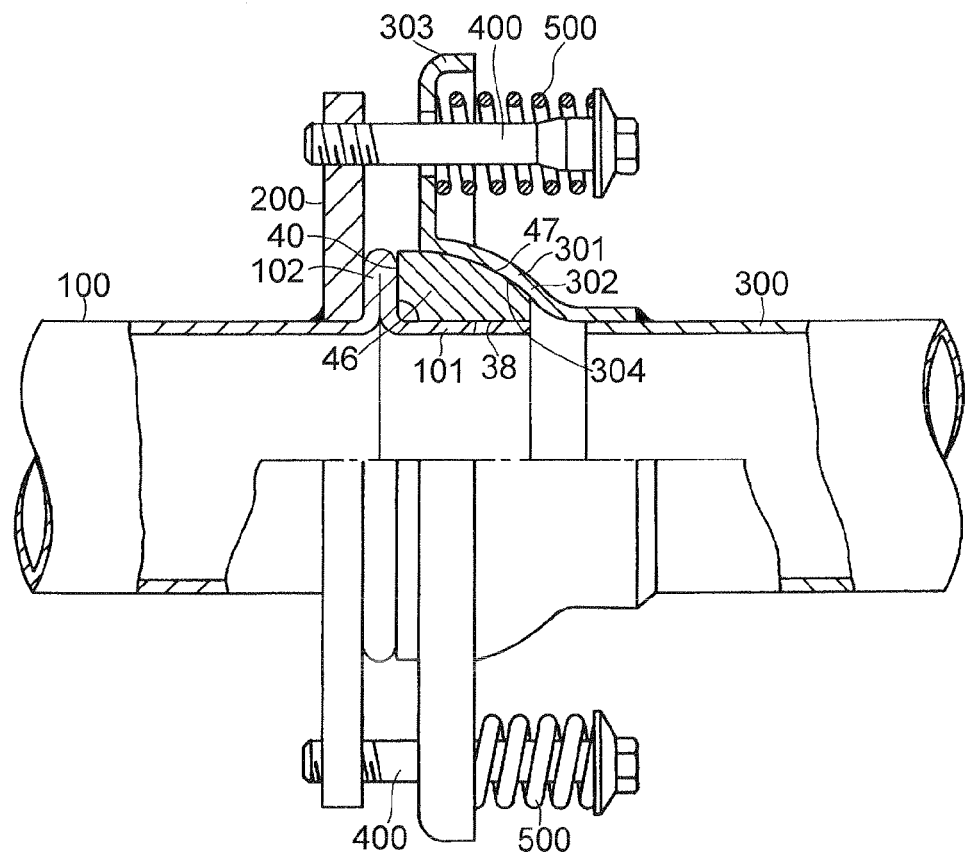
FIG. 20 is an explanatory cross-sectional view of an exhaust pipe spherical joint incorporating the spherical annular seal member in accordance with the present invention.
Figure 21:
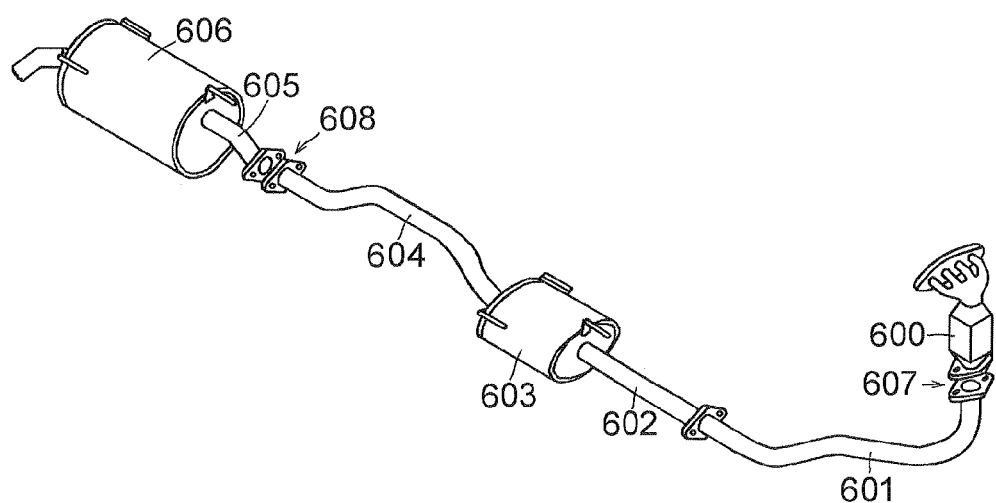
FIG. 21 is an explanatory diagram of an exhaust system of an automobile engine.

The spherical annular seal member 46 is used by being incorporated in the exhaust pipe spherical joint shown in FIG. 20. That is, in the exhaust pipe spherical joint shown in FIG. 20, a flange 200, which includes a flange portion 102 formed integrally on an upstream-side exhaust pipe 100 by leaving a pipe end portion 101, is provided uprightly on an outer peripheral surface of the upstream-side exhaust pipe 100 which is connected to the engine side. The spherical annular seal member 46 is fitted over the pipe end portion 101 at the cylindrical inner surface 38 defining the through hole 37, and is seated with its large-diameter side annular end face 40 abutting against the flange portion 102 of the flange 200. A flared portion 301, which integrally has a concave spherical surface portion 302 and a flange portion 303 continuous from the concave spherical surface portion 302, is secured to a downstream-side exhaust pipe 300 disposed in such a manner as to oppose the upstream-side exhaust pipe 100 and is connected to the muffler side. An inner surface 304 of the concave spherical surface portion 302 is in slidable contact with the smooth composite surface 48 in which the surface 27 constituted by the knitted metal wire net 14 of the reinforcing member and the surface 26 constituted by the solid lubricant are present in mixed form in the outer surface 47 of the outer layer 45 of the spherical annular seal member 46.

In the exhaust pipe spherical joint shown in FIG. 20, the downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between an enlarged head of the bolt 400 and the flange portion 303. Further, the exhaust pipe spherical joint is arranged such that relative angular displacements occurring in the upstream- and downstream-side exhaust pipes 100 and 300 are allowed by sliding contact between the smooth composite surface 48 serving as a sliding surface of the outer layer 45 of the spherical annular seal member 46 and the inner surface 304 of the concave spherical surface portion 302 of the flared portion 301 formed at the end of the downstream-side exhaust pipe 300.

EXAMPLES

Next, the present invention will be described in detail in accordance with examples. It should be noted that the present invention is not limited to these examples.

Example 1

By using one austenitic stainless steel wire (SUS 304) with a diameter of 0.28 mm as a fine metal wire, a hollow cylindrical knitted metal wire net whose mesh size was 5 mm long and 4 mm wide was fabricated and was passed between a pair of rollers, thereby preparing a belt-shaped knitted metal wire net serving as the reinforcing member for the spherical annular base member. This belt-shaped knitted metal wire net and the expanded graphite sheet I having a density of 1.12 Mg/m$^3$ and a thickness of 0.38 mm were superposed one on top of the other to form a superposed assembly. The superposed assembly was then convoluted with the belt-shaped knitted metal wire net placed on the inner side such that the belt-shaped knitted metal wire net was convoluted by two turns and the expanded graphite sheet I was convoluted by five turns in total, thereby preparing a tubular base part in which the expanded graphite sheet I was placed on the outermost periphery. In this tubular base part, widthwise opposite end portions of the expanded graphite sheet I respectively projected from the belt-shaped knitted metal wire net in the widthwise direction of the belt-shaped knitted metal wire net.

By using one austenitic stainless steel wire (SUS 316) with a diameter of 0.15 mm as a fine metal wire, a hollow cylindrical knitted metal wire net serving as the reinforcing member for the partially convex spherical intermediate layer whose mesh size was 2.01 mm long and 0.70 mm wide (measured by a microscope) was continuously knitted, and an expanded graphite sheet I similar to the above-described expanded graphite sheet I was continuously inserted between two layers of the interior of that hollow cylindrical knitted metal wire net. This hollow cylindrical knitted metal wire net with the expanded graphite sheet I inserted between the two layers was fed, starting with the insertion start end of the expanded graphite sheet I, into a nip between a pair of cylindrical rollers and was pressurized in the thicknesswise direction of the expanded graphite sheet I, thereby forming the hollow cylindrical knitted metal wire net into a flattened knitted metal wire net. The flattened knitted metal wire net and the expanded graphite sheet I were thus pressure bonded to each other such that the expanded graphite of the expanded graphite sheet I was filled in the meshes of the flattened knitted metal wire net, and portions of the flattened knitted metal wire net and the expanded graphite of the expanded graphite sheet were both exposed on the outer surface, while the other portions of the flattened knitted metal wire net were embedded in the expanded graphite sheet I. Thus, a sheet for the partially convex spherical intermediate layer was fabricated in which the occupying area ratio of the surface constituted by the knitted metal wire net on the outer surface was 34.5%, and portions which were not filled with the expanded graphite of the expanded graphite sheet I were present on both widthwise sides of the knitted metal wire net.

A tubular base member was formed by convoluting the sheet for the partially convex spherical intermediate layer by two turns around the outer peripheral surface of the aforementioned tubular base part.

An expanded graphite sheet I similar to the above-described expanded graphite sheet I and having a density of 1.12 Mg/m$^3$ and a thickness of 0.38 mm was separately prepared, and an alumina sol was prepared in which, as hydrated alumina, boehmite (alumina monohydrate: $Al_2O_3.H_2O$) was dispersedly contained in water serving as a dispersion medium containing nitric acid acting as a deflocculant and whose hydrogen ion concentration (pH) exhibited 2. An aqueous dispersion (22.5% by mass of h-BN, 25.0% by mass of PTFE, and 2.5% by mass of boehmite), in which an h-BN powder and a PTFE powder were dispersedly contained in this alumina sol and which dispersedly contained as a solid content 50% by mass of a lubricating composition containing 45.0% by mass of h-BN, 50.0% by mass of PTFE, and 5.0% by mass of boehmite, was roller coated on one surface of the expanded graphite sheet I and was dried to form on one surface of the expanded graphite sheet a coating layer of the solid lubricant (45.0% by mass of h-BN, 50.0% by mass of PTFE, and 5.0% by mass of boehmite) consisting of the lubricating composition, thereby fabricating a multilayer sheet composed of the expanded graphite sheet and the coating layer of the solid lubricant coating one surface of this expanded graphite sheet.

By using one austenitic stainless steel wire (SUS 316) similar to the knitted metal wire net serving as the reinforcing member for the partially convex spherical intermediate layer and having a diameter of 0.15 mm, a hollow cylindrical knitted metal wire net whose mesh size was 2.01 mm long and 0.70 mm wide was continuously knitted, and the aforementioned multilayer sheet was continuously inserted between two layers of the interior of that hollow cylindrical knitted metal wire net. This hollow cylindrical knitted metal wire net with the multilayer sheet inserted between the two layers was fed, starting with the insertion start end of the multilayer sheet, into a nip between a pair of cylindrical rollers and was pressurized in the thicknesswise direction of the multilayer sheet, thereby forming the hollow cylindrical knitted metal wire net into a flattened knitted metal wire net. The multilayer sheet and the flattened knitted metal wire net were thus pressure bonded to each other so as to be integrated such that the expanded graphite of the expanded graphite sheet I of the multilayer sheet was filled in the meshes of that knitted metal wire net, and portions of the knitted metal wire net and the solid lubricant of the coating layer of the multilayer sheet were both exposed on the outer surface, while the other portions of the knitted metal wire net were embedded in the coating layer and the expanded graphite sheet of the multilayer sheet. Thus, a sheet for the outer layer was fabricated in which the occupying area ratio of the surface constituted by the knitted metal wire net on the outer surface was 34.5%, and on the outer surface of which a surface constituted by the knitted metal wire net and a surface constituted by the solid lubricant of the coating layer were exposed in mixed form.

The sheet for the outer layer, in a state in which its surface where the solid lubricant was exposed was placed on the outer side, was wound around the outer peripheral surface of the aforementioned tubular base member, thereby fabricating a cylindrical preform.

This cylindrical preform was fitted over the stepped core of the die shown in FIG. 19, and was disposed in the hollow portion of the die.

The cylindrical preform disposed in the hollow cylindrical portion of the die was subjected to compression forming under a pressure of 294 N/mm$^2$ (3 tons/cm$^2$) in the direction of the core axis. Thus, a spherical annular seal member was fabricated which included: a spherical annular base member defined by a cylindrical inner surface which defines a through hole in the central portion and where the belt-shaped knitted metal wire net was exposed as the reinforcing member for the spherical annular base member, a partially convex spherical surface, and large- and small-diameter side annular end faces of the partially convex spherical surface; a plurality of partially convex spherical intermediate layers formed integrally on the partially convex spherical surface of the spherical annular base member and laminated in the radial direction; and an outer layer formed integrally on the partially convex spherical surface of the outermost partially convex spherical intermediate layer of these partially convex spherical intermediate layers.

In the spherical annular seal member thus obtained, the spherical annular base member included the reinforcing member for the spherical annular base member made from the compressed knitted metal wire net which was knitted by using a fine metal wire with a diameter of 0.28 mm and whose mesh size was 5 mm long and 4 mm wide and the heat-resistant material containing expanded graphite and compressed in such a manner as to fill the meshes of the knitted metal wire net of this reinforcing member and to be formed integrally with the knitted metal wire net of this reinforcing member in mixed form. Each of the partially convex spherical intermediate layers included the reinforcing member for the partially convex spherical intermediate layer made from the compressed knitted metal wire net which was knitted by using a fine metal wire with a diameter of 0.15 mm and whose mesh size was 2.01 mm long and 0.70 mm wide and the heat-resistant material for the partially convex spherical intermediate layer containing expanded graphite and compressed in such a manner as to fill the meshes of the knitted metal wire net of this reinforcing member and to be formed integrally with the reinforcing member in mixed form. The occupying area ratio of the surface constituted by the reinforcing member for the partially convex spherical intermediate layer on the outer surface of each of the partially convex spherical intermediate layers was 34.5%. As for the outer layer, the reinforcing member for the outer layer made from the knitted metal wire net which was knitted by using a fine metal wire with a diameter of 0.15 mm and whose mesh size was 2.01 mm long and 0.70 mm wide, the solid lubricant consisting of a lubricating composition, and the heat-resistant material for the outer layer containing expanded graphite were compressed such that meshes of the knitted metal wire net of the reinforcing member for the outer layer were filled with the solid lubricant and the heat-resistant material for the outer layer. The outer surface of that outer layer was formed into a smooth composite surface in which the surface constituted by the reinforcing member for the outer layer and the surface constituted by the solid lubricant were exposed in mixed form. On the outer surface of that outer layer, the occupying area ratio of the surface constituted by the reinforcing member for the outer layer was 34.5%.

Example 2

A tubular base part was fabricated in the same way as in Example 1 described above. In this tubular base part, widthwise opposite end portions of the expanded graphite sheet I respectively projected from the belt-shaped knitted metal wire net in the widthwise direction thereof.

By using one austenitic stainless steel wire (SUS 316) with a diameter of 0.15 mm as a fine metal wire, a hollow cylindrical knitted metal wire net serving as the reinforcing member for the partially convex spherical intermediate layer whose mesh size was 1.24 mm long and 0.64 mm wide (measured by a microscope) was continuously knitted, and an expanded graphite sheet I similar to the above-described expanded graphite sheet I was continuously inserted between two layers of the interior of that hollow cylindrical knitted metal wire net. This hollow cylindrical knitted metal wire net with the expanded graphite sheet I inserted therein was fed, starting with the insertion start end of the expanded graphite sheet I, into a nip between a pair of cylindrical rollers and was pressurized in the thicknesswise direction of the expanded graphite sheet I, thereby forming the hollow cylindrical knitted metal wire net into a flattened knitted metal wire net. The knitted metal wire net and the expanded graphite sheet I were thus pressure bonded to each other such that the expanded graphite of the expanded graphite sheet I was filled in the meshes of the knitted metal wire net, and portions of the knitted metal wire net and the expanded graphite of the expanded graphite sheet I were both exposed on the outer surface, while the other portions of the knitted metal wire net were embedded in the expanded graphite sheet I. Thus, a sheet for the partially convex spherical intermediate layer was fabricated in which the occupying area ratio of the surface constituted by the knitted metal wire net on the outer surface was 42.1%, and portions which were not filled with the expanded graphite of the expanded graphite sheet were present on both widthwise sides of the knitted metal wire net.

A tubular base member was formed by convoluting the sheet for the partially convex spherical intermediate layer by two turns around the outer peripheral surface of the aforementioned tubular base part. In the same way as in Example 1 described above, a multilayer sheet was fabricated in which a coating layer of the solid lubricant (45.0% by mass of h-BN, 50.0% by mass of PTFE, and 5.0% by mass of boehmite) was formed on one surface of the expanded graphite sheet I.

A hollow cylindrical knitted metal wire net, which was similar to the knitted metal wire net for forming the aforementioned sheet for the partially convex spherical intermediate layer and whose mesh size was 1.24 mm long and 0.64 mm wide, was continuously knitted, and the aforementioned multilayer sheet was continuously inserted between two layers of the interior of that hollow cylindrical knitted metal wire net. This hollow cylindrical knitted metal wire net with the multilayer sheet inserted therein was fed, starting with the insertion start end of the multilayer sheet, into a nip between a pair of cylindrical rollers and was pressurized in the thicknesswise direction of the multilayer sheet, thereby deforming the hollow cylindrical knitted metal wire net into a flattened knitted metal wire net. The multilayer sheet and the knitted metal wire net were thus pressure bonded to each other so as to be integrated such that the expanded graphite of the expanded graphite sheet I of the multilayer sheet was filled in the meshes of that knitted metal wire net, and portions of the knitted metal wire net and the expanded graphite of the expanded graphite sheet I of the multilayer sheet were both exposed on the outer surface, while the other portions of the knitted metal wire net were embedded in the coating layer and the expanded graphite sheet of the multilayer sheet. Thus, a sheet for the outer layer was fabricated in which the occupying area ratio of the surface constituted by the knitted metal wire net on the outer surface was 42.1%, and on the outer surface of which a surface constituted by the knitted metal wire net and a surface constituted by the solid lubricant were exposed in mixed form.

The sheet for the outer layer, in a state in which its surface where the solid lubricant was exposed was placed on the outer side, was wound around the outer peripheral surface of the aforementioned tubular base member, thereby fabricating a cylindrical preform. Thereafter, in a similar method to that of Example 1, a spherical annular seal member was fabricated which included: a spherical annular base member defined by a cylindrical inner surface which defines a through hole in the central portion and where the belt-shaped knitted metal wire net was exposed as the reinforcing member for the spherical annular base member, and the large- and small-diameter side annular end faces of the partially convex spherical surface; a plurality of partially convex spherical intermediate layers formed integrally on the partially convex spherical surface of the spherical annular base member and laminated in the radial direction; and an outer layer formed integrally on the partially convex spherical surface of the outermost partially convex spherical intermediate layer of these partially convex spherical intermediate layers.

In the spherical annular seal member thus obtained, the spherical annular base member included the reinforcing member for the spherical annular base member made from the compressed knitted metal wire net which was knitted by using a fine metal wire with a diameter of 0.28 mm and whose mesh size was 5 mm long and 4 mm wide and the heat-resistant material containing expanded graphite and compressed in such a manner as to fill the meshes of the knitted metal wire net of this reinforcing member and to be formed integrally with the knitted metal wire net of this reinforcing member in mixed form. Each of the partially convex spherical intermediate layers included the reinforcing member for the partially convex spherical intermediate layer made from the compressed knitted metal wire net which was knitted by using a fine metal wire with a diameter of 0.15 mm and whose mesh size was 1.24 mm long and 0.64 mm wide and the heat-resistant material for the partially convex spherical intermediate layer containing expanded graphite and compressed in such a manner as to fill the meshes of the hollow cylindrical knitted metal wire net of this reinforcing member and to be formed integrally with the reinforcing member in mixed form. The occupying area ratio of the surface constituted by the reinforcing member for the partially convex spherical intermediate layer on the outer surface of each of the partially convex spherical intermediate layers was 42.1%. As for the outer layer, the reinforcing member for the outer layer made from the knitted metal wire net which was knitted by using a fine metal wire with a diameter of 0.15 mm and whose mesh size was 1.24 mm long and 0.64 mm wide, the solid lubricant consisting of a lubricating composition, and the heat-resistant material for the outer layer containing expanded graphite were compressed such that meshes of the knitted metal wire net of the reinforcing member for the outer layer were filled with the solid lubricant and the heat-resistant material for the outer layer. The outer surface of that outer layer was formed into a smooth composite surface in which the surface constituted by the reinforcing member for the outer layer and the surface constituted by the solid lubricant were exposed in mixed form. On the outer surface of that outer layer, the occupying area ratio of the surface constituted by the reinforcing member for the outer layer was 42.1%.

Example 3

A spherical annular seal member was fabricated by using similar component materials and a similar method to those of Example 1 described above except that an expanded graphite sheet II containing 4.0% by mass of aluminum primary phosphate and expanded graphite and having a density of 1.12 Mg/m$^3$ and a thickness of 0.4 mm was used as the expanded graphite sheet of each heat-resistant material in Example 1 described above.

In the spherical annular seal member thus obtained, the spherical annular base member included the reinforcing member for the spherical annular base member made from the compressed knitted metal wire net which was knitted by using a fine metal wire with a diameter of 0.28 mm and whose mesh size was 5 mm long and 4 mm wide and the heat-resistant material containing aluminum primary phosphate and expanded graphite and compressed in such a manner as to fill the meshes of the knitted metal wire net of this reinforcing member and to be formed integrally with the knitted metal wire net of this reinforcing member in mixed form. Each of the partially convex spherical intermediate layers included the reinforcing member for the partially convex spherical intermediate layer made from the compressed knitted metal wire net which was knitted by using a fine metal wire with a diameter of 0.15 mm and whose mesh size was 2.01 mm long and 0.70 mm wide and the heat-resistant material for the partially convex spherical intermediate layer containing aluminum primary phosphate and expanded graphite and compressed in such a manner as to fill the meshes of the knitted metal wire net of this reinforcing member and to be formed integrally with the reinforcing member in mixed form. The occupying area ratio of the surface constituted by the reinforcing member for the partially convex spherical intermediate layer on the outer surface of each of the partially convex spherical intermediate layers was 34.5%. As for the outer layer, the reinforcing member for the outer layer made from the knitted metal wire net which was knitted by using a fine metal wire with a diameter of 0.15 mm and whose mesh size was 2.01 mm long and 0.70 mm wide, the solid lubricant consisting of a lubricating composition, and the heat-resistant material for the outer layer containing aluminum primary phosphate and expanded graphite were compressed such that meshes of the knitted metal wire net of the reinforcing member for the outer layer were filled with the solid lubricant and the heat-resistant material for the outer layer. The outer surface of that outer layer was formed into a smooth composite surface in which the surface constituted by the reinforcing member for the outer layer and the surface constituted by the solid lubricant were exposed in mixed form. On the outer surface of that outer layer, the occupying area ratio of the surface constituted by the reinforcing member for the outer layer was 34.5%.

Example 4

A spherical annular seal member was fabricated by using similar component materials to those of Example 2 described above and a similar method to that of Example 1 except that an expanded graphite sheet III containing 1.0% by mass of phosphorus pentoxide, 4.0% by mass of aluminum primary phosphate, and expanded graphite and having a density of 1.12 Mg/m³ and a thickness of 0.4 mm was used as the expanded graphite sheet of each heat-resistant material in Example 2 described above.

In the spherical annular seal member thus obtained, the spherical annular base member included the reinforcing member for the spherical annular base member made from the compressed knitted metal wire net which was knitted by using a fine metal wire with a diameter of 0.28 mm and whose mesh size was 5 mm long and 4 mm wide and the heat-resistant material containing 4.0% by mass of aluminum primary phosphate, 1.0% by mass of phosphorus pentoxide, and expanded graphite and compressed in such a manner as to fill the meshes of the knitted metal wire net of this reinforcing member and to be formed integrally with the knitted metal wire net of this reinforcing member in mixed form. Each of the partially convex spherical intermediate layers included the reinforcing member for the partially convex spherical intermediate layer made from the compressed knitted metal wire net which was knitted by using a fine metal wire with a diameter of 0.15 mm and whose mesh size was 1.24 mm long and 0.64 mm wide and the heat-resistant material containing 4.0% by mass of aluminum primary phosphate, 1.0% by mass of phosphorus pentoxide, and expanded graphite and compressed in such a manner as to fill the meshes of the hollow cylindrical knitted metal wire net of this reinforcing member and to be formed integrally with the reinforcing member in mixed form. The occupying area ratio of the surface constituted by the reinforcing member for the partially convex spherical intermediate layer on the outer surface of each of the partially convex spherical intermediate layers was 42.1%. As for the outer layer, the reinforcing member for the outer layer made from the knitted metal wire net which was knitted by using a fine metal wire with a diameter of 0.15 mm and whose mesh size was 1.24 mm long and 0.64 mm wide, the solid lubricant consisting of a lubricating composition, and the heat-resistant material for the outer layer containing 4.0% by mass of aluminum primary phosphate, 1.0% by mass of phosphorus pentoxide, and expanded graphite were compressed such that meshes of the knitted metal wire net of the reinforcing member for the outer layer were filled with the solid lubricant and the heat-resistant material for the outer layer. The outer surface of that outer layer was formed into a smooth composite surface in which the surface constituted by the reinforcing member for the outer layer and the surface constituted by the solid lubricant were exposed in mixed form. On the outer surface of that outer layer, the occupying area ratio of the surface constituted by the reinforcing member for the outer layer was 42.1%.

Comparative Example 1

Corresponding to Example 3 in Patent Document 2

By using one austenitic stainless steel wire (SUS 304) with a diameter of 0.28 mm as a fine metal wire, a hollow cylindrical knitted metal wire net whose mesh size was 5 mm long and 4 mm wide was fabricated and was passed between a pair of rollers to form a belt-shaped knitted metal wire net, and this was used as the reinforcing member for the spherical annular base member. As the expanded graphite sheet serving as the heat-resistant material for the spherical annular base member, the expanded graphite sheet I having a density of 1.12 Mg/m³ and a thickness of 0.4 mm was used, and this expanded graphite sheet I and the belt-shaped knitted metal wire net were superposed one on top of the other to form a superposed assembly. This superposed assembly was then convoluted with the belt-shaped knitted metal wire net placed on the inner side, thereby fabricating a tubular base member in which the expanded graphite sheet I was placed on the outermost periphery. In this tubular base member, widthwise opposite end portions of the expanded graphite sheet I respectively projected from the belt-shaped knitted metal wire net in the widthwise direction of the belt-shaped knitted metal wire net serving as the reinforcing member for the spherical annular base member.

As the heat-resistant material for the outer layer, the expanded graphite sheet I having a density of 0.3 Mg/m³ and a thickness of 1.35 mm was used. As the reinforcing member for the outer layer, a hollow cylindrical knitted metal wire net was used which was continuously knitted by using an austenitic stainless steel wire (SUS 304) with a diameter of 0.15 mm and whose mesh size was 3.5 mm long and 2.5 mm wide, and the expanded graphite sheet I serving as the heat-resistant material for the outer layer was continuously inserted into the interior of that hollow cylindrical knitted metal wire net. The hollow cylindrical knitted metal wire net with that expanded graphite sheet I inserted therein was fed, starting with the insertion start end of the expanded graphite sheet I, into a nip (the nip Δ1 was set to 0.50 mm) between a cylindrical roller and a roller having on its outer peripheral surface a plurality of annular recessed grooves along the axial direction, so as to be pressurized in the thicknesswise direction of the expanded graphite sheet I, and was further fed into a nip (this nip Δ2 was set to 0.45 mm) between another pair of cylindrical rollers so as to be pressurized to form the hollow cylindrical knitted metal wire net into a flattened knitted metal wire net. Thus, a composite sheet for the outer layer was fabricated in which the expanded graphite sheet and the knitted metal wire net were pressure bonded to each other such that the expanded graphite of the expanded graphite sheet I was tightly filled in the meshes of the knitted metal wire net, and the knitted metal wire net was embedded in the expanded graphite sheet I, whereby the surface of the expanded graphite sheet I and the surface constituted by the knitted metal wire net were made flush with each other, and the surface constituted by the knitted metal wire net and the surface constituted by the expanded graphite of the expanded graphite sheet were exposed on the outer surface in a dotted manner.

As the lubricating composition, an aqueous dispersion (22.5% by mass of h-BN, 25.0% by mass of PTFE, and 2.5% by mass of boehmite) was used which was similar to that of Example 1 described above and which dispersedly contained as a solid content 50% by mass of a lubricating composition containing 45.0% by mass of h-BN, 50.0% by mass of PTFE, and 5.0% by mass of boehmite. This aqueous dispersion was roller coated on the surface of that composite sheet on the side which was pressurized by the aforementioned roller having the annular recessed grooves, and was then dried, thereby fabricating a multilayer sheet for the outer layer in which a coating layer of the solid lubricant (45.0% by mass of h-BN, 50.0% by mass of PTFE, and 5.0% by mass of boehmite) consisting of the lubricating composition was formed on one surface of that composite sheet.

The multilayer sheet for the outer layer with its coating layer facing the outside was wound around the outer peripheral surface of the aforementioned tubular base member, thereby fabricating a cylindrical preform. Thereafter, by compression forming similar to that of Example 1 described above, a spherical annular seal member was fabricated which included: a spherical annular base member defined by a cylindrical inner surface defining a through hole in the central portion, a partially convex spherical surface, and large- and small-diameter side annular end faces of the partially convex spherical surface; and an outer layer formed integrally on the partially convex spherical surface of the spherical annular base member.

Figure 22:
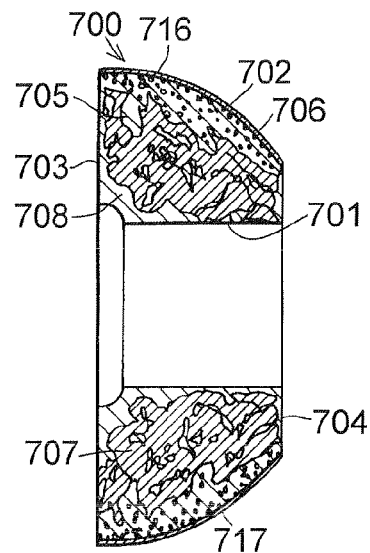
FIG. 22 is an explanatory cross-sectional view illustrating a conventional spherical annular seal member.
Figure 23:
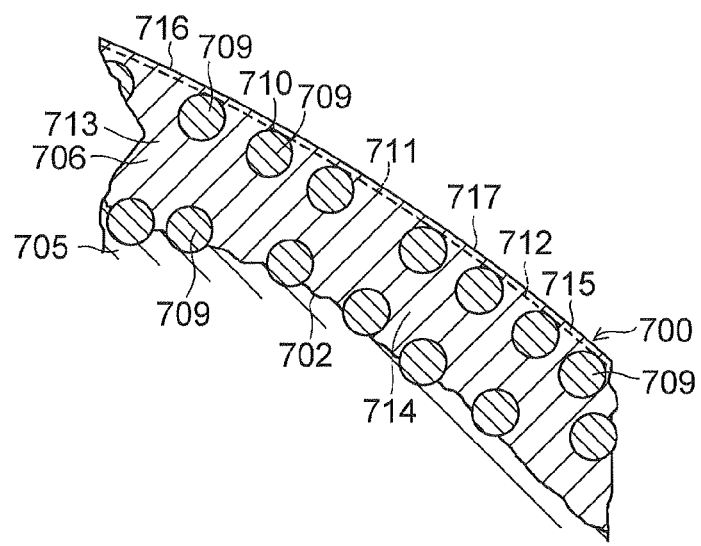
FIG. 23 is a partially enlarged explanatory cross-sectional view of the spherical annular seal member shown in FIG. 22.

In the spherical annular seal member thus obtained, the spherical annular base member included the heat-resistant material for the spherical annular base member containing compressed expanded graphite and the reinforcing member for the spherical annular base member made from the compressed knitted metal wire net, which was knitted by using a fine metal wire with a diameter of 0.28 mm and whose mesh size was 5 mm long and 4 mm wide, the reinforcing member for the spherical annular base member having structural integrity by being intertwined with the compressed expanded graphite sheet I of the heat-resistant material for the spherical annular base member. The outer layer included the reinforcing member made from the compressed knitted metal wire net, the heat-resistant material made from the expanded graphite sheet I compressed in such a manner as to fill the meshes of the knitted metal wire net of that reinforcing member, and the solid lubricant of the coating layer, the outer surface of the smooth outer layer being constituted by the solid lubricant of the coating layer (see FIGS. 22 and 23).

Comparative Example 2

Corresponding to Example 6 in Patent Document 2

A hollow cylindrical knitted metal wire net similar to that of Comparative Example 1 described above was used as the reinforcing member for the spherical annular base member. As the expanded graphite sheet serving as the heat-resistant material for the spherical annular base member, the expanded graphite sheet II was used which contained 4.0% by mass of aluminum primary phosphate and expanded graphite and had a density of 1.12 Mg/m$^3$ and a thickness of 0.4 mm. This expanded graphite sheet II and the belt-shaped knitted metal wire net were superposed one on top of the other to form a superposed assembly. This superposed assembly was then convoluted with the belt-shaped knitted metal wire net placed on the inner side, thereby fabricating a tubular base member in which the expanded graphite sheet II was placed on the outermost periphery. In this tubular base member, widthwise opposite end portions of the expanded graphite sheet II respectively projected from the belt-shaped knitted metal wire net in the widthwise direction of the belt-shaped knitted metal wire net serving as the reinforcing member for the spherical annular base member.

As the expanded graphite sheet serving as the heat-resistant material for the outer layer, the expanded graphite sheet II was used which contained 4.0% by mass of aluminum primary phosphate and expanded graphite and had a density of 0.3 Mg/m$^3$ and a thickness of 1.35 mm. By using an austenitic stainless steel wire (SUS 304) similar to that of Comparative Example 1 and having a diameter of 0.15 mm, a hollow cylindrical knitted metal wire net serving as the heat-resistant material for the outer layer was continuously knitted whose mesh size was 3.5 mm long and 2.5 mm wide, and the expanded graphite sheet II serving as the heat-resistant material for the outer layer was continuously inserted into the interior of that hollow cylindrical knitted metal wire net. Thereafter, in a method similar to that of Comparative Example 1 described above, a composite sheet for the outer layer was fabricated in which the surface of the heat-resistant material for the outer layer and the surface of the reinforcing member for the outer layer were made flush with each other, and the surface of the reinforcing member and the surface of the heat-resistant material were exposed.

In the same way as in Comparative Example 1 described above, a multilayer sheet for the outer layer was fabricated in which a coating layer of the solid lubricant (45.0% by mass of h-BN, 50.0% by mass of PTFE, and 5.0% by mass of boehmite) was formed on one surface of the composite sheet for the outer layer.

The multilayer sheet for the outer layer with its coating layer facing the outside was wound around the outer peripheral surface of the aforementioned tubular base member, thereby fabricating a cylindrical preform. Thereafter, by compression forming similar to that of Example 1 described above, a spherical annular seal member was fabricated which included: a spherical annular base member defined by a cylindrical inner surface defining a through hole in the central portion, a partially convex spherical surface, and large- and small-diameter side annular end faces of the partially convex spherical surface; and an outer layer formed integrally on the partially convex spherical surface of the spherical annular base member.

In the spherical annular seal member thus obtained, the spherical annular base member included the heat-resistant material constituted by the compressed expanded graphite sheet II containing 4.0% by mass of aluminum primary phosphate and expanded graphite and the reinforcing member for the spherical annular base member made from the knitted metal wire net, which was knitted by using a fine metal wire with a diameter of 0.28 mm and whose mesh size was 5 mm long and 4 mm wide, the reinforcing member for the spherical annular base member having structural integrity by being intertwined with the compressed expanded graphite sheet II. The outer layer included the reinforcing member made from the compressed knitted metal wire net, the heat-resistant material made from the expanded graphite sheet II compressed in such a manner as to fill the meshes of the knitted metal wire net of that reinforcing member, and the solid lubricant of the coating layer, the outer surface of the smooth outer layer being constituted by the solid lubricant of the coating layer.

Comparative Example 3

Corresponding to Example 8 in Patent Document 2

A belt-shaped knitted metal wire net similar to that of Comparative Example 1 described above was used as the reinforcing member for the spherical annular base member. As the expanded graphite sheet serving as the heat-resistant material for the spherical annular base member, the expanded graphite sheet III was used which contained 1.0% by mass of phosphorus pentoxide, 4.0% by mass of aluminum primary phosphate, and expanded graphite and had a density of 1.12 Mg/m$^3$ and a thickness of 0.4 mm. A tubular base member was fabricated by convoluting a superposed assembly comprised of this expanded graphite sheet III and the belt-shaped knitted metal wire net with that expanded graphite sheet III disposed on the outermost periphery. In this tubular base member, widthwise opposite end portions of the expanded graphite sheet III respectively projected from the belt-shaped knitted metal wire net in the widthwise direction of the belt-shaped knitted metal wire net serving as the reinforcing member for the spherical annular base member.

As the heat-resistant material for the outer layer, the expanded graphite sheet III containing 1.0% by mass of phosphorus pentoxide, 4.0% by mass of aluminum primary phosphate, and expanded graphite and having a density of 0.3 Mg/m$^3$ and a thickness of 1.35 mm was used. As the reinforcing member for the outer layer, a hollow cylindrical knitted metal wire net was used which was similar to that of Comparative Example 1 described above and which was continuously knitted by using an austenitic stainless steel wire (SUS 304) with a diameter of 0.15 mm and whose mesh size was 3.5 mm long and 2.5 mm wide. The expanded graphite sheet III serving as the heat-resistant material for the outer layer was continuously inserted into the interior of that hollow cylindrical knitted metal wire net. Thereafter, in a method similar to that of Comparative Example 1, a composite sheet for the outer layer was fabricated in which the surface of the expanded graphite sheet III serving as the heat-resistant material for the outer layer and consisting of 1.0% by mass of phosphorus pentoxide, 4.0% by mass of aluminum primary phosphate, and expanded graphite and the surface constituted by the knitted metal wire net serving as the reinforcing member for the outer layer were made flush with each other, and the surface constituted by that knitted metal wire net and the surface of the expanded graphite sheet III and consisting of 1.0% by mass of phosphorus pentoxide, 4.0% by mass of aluminum primary phosphate, and expanded graphite were exposed on the outer surface in a dotted manner.

In the same way as in Comparative Example 1 described above, a multilayer sheet for the outer layer was fabricated in which a coating layer of the solid lubricant (45.0% by mass of h-BN, 50.0% by mass of PTFE, and 5.0% by mass of boehmite) was formed on one surface of the composite sheet for the outer layer.

The multilayer sheet for the outer layer with its coating layer facing the outside was wound around the outer peripheral surface of the aforementioned tubular base member, thereby fabricating a cylindrical preform. Thereafter, by compression forming similar to that of Example 1 described above, a spherical annular seal member was fabricated which included: a spherical annular base member defined by a cylindrical inner surface defining a through hole in the central portion, a partially convex spherical surface, and large- and small-diameter side annular end faces of the partially convex spherical surface; and an outer layer formed integrally on the partially convex spherical surface of the spherical annular base member.

In the spherical annular seal member thus obtained, the spherical annular base member included the heat-resistant material constituted by the compressed expanded graphite sheet III containing 4.0% by mass of aluminum primary phosphate, 1.0% by mass of phosphorus pentoxide, and expanded graphite and the reinforcing member for the spherical annular base member made from the knitted metal wire net, which was knitted by using a fine metal wire with a diameter of 0.28 mm and whose mesh size was 5 mm long and 4 mm wide, the reinforcing member for the spherical annular base member having structural integrity by being intertwined with the compressed expanded graphite sheet III. The outer layer included the reinforcing member made from the compressed knitted metal wire net, the heat-resistant material made from the expanded graphite sheet III compressed in such a manner as to fill the meshes of the knitted metal wire net of that reinforcing member, and the solid lubricant of the coating layer, and the outer surface of the outer layer which was formed so as to be flat and smooth was constituted by the solid lubricant of the coating layer.

Next, a description will be given of the results of tests conducted on the presence or absence of generation of abnormal frictional noise, the amount of gas leakage (l/min), and the amount of abrasion by incorporating the spherical annular seal members obtained in Examples 1 to 4 and Comparative Examples 1 to 4 described above into the exhaust pipe spherical joint shown in FIG. 20.

<Test Conditions on Presence or Absence of Generation of Abnormal Frictional Noise>

Pressing force using coil springs (spring set force): 1177 N
Oscillation angle: ±3°
Excitation frequency: 12 Hz
Temperature (outer surface temperature of the concave spherical surface portion 302 shown in FIG. 20): from room temperature (25° C.) to 500° C.
No. of test oscillations: 12 cycles (3,000,000 oscillations)
Mating member (material of the flared portion 301 shown in FIG. 20):
SUS 304

<Test Method and Measurement Method>

After 45,000 oscillating motions are performed at room temperature (25° C.) by setting an oscillating motion at +3° at an excitation frequency of 12 Hz as a unit of oscillation, the ambient temperature is raised to a temperature of 500° C., while continuing the oscillating motions (the number of oscillating motions during the temperature rise being 45,000). When the ambient temperature reached the temperature of 500° C., 115,000 oscillating motions are performed, and the ambient temperature is subsequently allowed to drop to room temperature while continuing the oscillating motions (the number of oscillating motions during the temperature drop being 45,000). A combined total of 250,000 oscillating motions is set as one cycle, and 12 cycles (3,000,000 oscillations) are performed.

The evaluation of the presence or absence of the occurrence of abnormal frictional noise was conducted at the aforementioned points in time, i.e., (1) after 500,000 oscillating motions, (2) after 1,000,000 oscillating motions, (3) after 1,500,000 oscillating motions, and (4) after 2,000,000 oscillating motions, (5) after 2,500,000 oscillating motions, and (6) after 3,000,000 oscillating motions, by using the following judgment levels.

<Judgment Levels of Abnormal Frictional Noise>

Code 0: No abnormal frictional noise is generated.
Code 0.5: The generation of abnormal frictional noise can be confirmed by a sound collection pipe.
Code 1: The generation of abnormal frictional noise can be confirmed at a position approx. 0.2 m away from the sliding portion of the exhaust pipe spherical joint.
Code 1.5: The generation of abnormal frictional noise can be confirmed at a position approx. 0.5 m away from the sliding portion of the exhaust pipe spherical joint.
Code 2: The generation of abnormal frictional noise can be confirmed at a position approx. 1 m away from the sliding portion of the exhaust pipe spherical joint.
Code 2.5: The generation of abnormal frictional noise can be confirmed at a position approx. 2 m away from the sliding portion of the exhaust pipe spherical joint.
Code 3: The generation of abnormal frictional noise can be confirmed at a position approx. 3 m away from the sliding portion of the exhaust pipe spherical joint.
Code 3.5: The generation of abnormal frictional noise can be confirmed at a position approx. 5 m away from the sliding portion of the exhaust pipe spherical joint.
Code 4: The generation of abnormal frictional noise can be confirmed at a position approx. 10 m away from the sliding portion of the exhaust pipe spherical joint.
Code 4.5: The generation of abnormal frictional noise can be confirmed at a position approx. 15 m away from the sliding portion of the exhaust pipe spherical joint.
Code 5: The generation of abnormal frictional noise can be confirmed at a position approx. 20 m away from the sliding portion of the exhaust pipe spherical joint.

In the overall assessment of the above-described determination levels, with respect to Codes 0 to 2.5 a determination was made that no abnormal frictional noise was generated (accepted), whereas with respect to Codes 3 to 5 a determination was made that abnormal frictional noise was generated (rejected).

In addition, measurement was made of the amount of abrasion of the outer layer of the spherical annular seal member according to each of Examples 1 to 4 and Comparative Examples 1 to 3 upon completion of 3,000,000 test oscillations under the above-described test conditions.

<Test Conditions of Gas Leakage Amount>
Pressing force using coil springs (spring set force): 588 N
Excitation angle: ±3°
Excitation frequency (oscillation velocity): 1.6 Hz
Temperature (outer surface temperature of the concave spherical surface portion 302 shown in FIG. 20): from room temperature (25° C.) to 500° C.
Number of oscillating motions: 3,000,000
Mating member (material of the flared portion 301 shown in FIG. 20): SUS 304

<Test Method>
The temperature was raised up to 500° C. while continuing the oscillating motion at ±3° at an excitation frequency of 1.6 Hz at room temperature. In a state in which that temperature was held, the oscillating motion was continued, and the amount of gas leakage was measured at the point of time when the number of oscillating motions reached 1,000,000, 2,000,000, and 3,000,000.

<Measurement Method of Gas Leakage Amount>
An opening of the upstream-side exhaust pipe 100 of the exhaust pipe spherical joint shown in FIG. 20 was closed, and dry air was allowed to flow from the downstream-side exhaust pipe 200 side under a pressure of 49 kPa (0.5 kgf/cm$^2$). The amount of gas leakage from the joint portion (sliding contact portions between the surface 47 of the spherical annular seal member 46 and the flared portion 301, fitting portions between the cylindrical inner surface 38 of the spherical annular seal member 46 and the pipe end portion 101 of the upstream-side exhaust pipe 100, and abutting portions between the annular end face 40 and the flange portion 102 provided uprightly on the upstream-side exhaust pipe 100) in a stationary neutral state and in an excited state was measured by means of a flowmeter, (1) at an early period of test (before start), (2) after 4 cycles (1,000,000 oscillating motions), (3) after 8 cycles (2,000,000 oscillating motions), and (4) after 12 cycles (3,000,000 oscillating motions).

Tables 1 and 2 show the results of the above-described tests.

TABLE 1

| | | | Examples | | | |
|---|---|---|---|---|---|---|
| | | | 1 | 2 | 3 | 4 |
| Determination of abnormal frictional noise | No. of oscillating motions: | 500,000 | 1.5 | 1.5 | 1.5 | 1.5 |
| | | 1,000,000 | 1.5 | 1.5 | 1.5 | 1.5 |
| | | 1,500,000 | 1.5 | 1.5 | 1.5 | 1.5 |
| | | 2,000,000 | 2 | 2 | 1.5 | 1 |
| | | 2,500,000 | 2 | 2 | 1.5 | 1 |
| | | 3,000,000 | 2 | 2 | 1.5 | 1 |
| | Overall judgment | | accepted | accepted | accepted | accepted |
| Amount of gas leakage | Stationary neutral state | (1) | 0.12 | 0.10 | 0.09 | 0.09 |
| | | (2) | 0.12 | 0.12 | 0.10 | 0.09 |
| | | (3) | 0.10 | 0.10 | 0.09 | 0.08 |
| | | (4) | 0.10 | 0.09 | 0.08 | 0.07 |
| | Oscillated state | (1) | 0.24 | 0.22 | 0.22 | 0.20 |
| | | (2) | 0.26 | 0.24 | 0.20 | 0.20 |
| | | (3) | 0.26 | 0.24 | 0.16 | 0.16 |
| | | (4) | 0.32 | 0.26 | 0.16 | 0.14 |
| Amount of abrasion (mm) | | | 0.20 | 0.20 | 0.18 | 0.17 |

TABLE 2

| | | | Comparative Examples | | |
|---|---|---|---|---|---|
| | | | 1 | 2 | 3 |
| Determination of abnormal frictional noise | No. of oscillating motions: | 500,000 | 1.5 | 1.5 | 1 |
| | | 1,000,000 | 2 | 1.5 | 1 |
| | | 1,500,000 | 3.5 | 3.5 | 3.5 |
| | | 2,000,000 | 3 | 3 | 3 |
| | | 2,500,000 | 3.5 | 3 | 2.5 |
| | | 3,000,000 | 3.5 | 3 | 2.5 |
| | Overall judgment | | rejected | rejected | rejected |
| Amount of gas leakage | Stationary neutral state | (1) | 0.12 | 0.08 | 0.06 |
| | | (2) | 0.12 | 0.09 | 0.08 |
| | | (3) | 0.16 | 0.14 | 0.12 |
| | | (4) | 0.20 | 0.16 | 0.14 |
| | Oscillated state | (1) | 0.20 | 0.22 | 0.22 |
| | | (2) | 0.36 | 0.30 | 0.32 |
| | | (3) | 0.64 | 0.58 | 0.56 |
| | | (4) | 1.34 | 1.18 | 1.12 |
| Amount of abrasion (mm) | | | 0.18* | 0.16* | 0.15* |

In the amount of abrasion in Table 2 above, as for the surface state of the outer layer after 3,000,000 oscillating motions of each of the spherical annular seal members according to Examples 1 to 4, the reinforcing member made from the metal wire net in the outermost layer had been worn away, and the second layer reinforcing member located in its lower layer was exposed, whereas, in the case of the outer layer of each of the spherical annular seal members according to Comparative Examples 1 to 3, the reinforcing member made from the metal wire net in the outermost layer had been worn away after 1,250,000 oscillating motions, and the heat-resistant material located in its lower layer and containing expanded graphite was exposed. The mark "*" for the amount of abrasion in the table is the amount of abrasion after 1,250,000 oscillating motions.

From the test results shown in Tables 1 and 2, it can be appreciated that the spherical annular seal members in accordance with Examples 1 to 4 are superior to the spherical annular seal members in accordance with Comparative Examples 1 to 3 in the evaluation of abnormal frictional noise. From the test result of the amount of abrasion shown in Table 2, it can be conjectured that the generation of abnormal frictional noise in the spherical annular seal members according to Comparative Examples 1 to 3 was due to the fact that, after 1,250,000 oscillating motions, the surface of sliding friction was a surface where only the heat-resistant material containing expanded graphite was exposed, and that the sliding friction with the mating member shifted to that with this exposed heat-resistant material.

As described above, according to the spherical annular seal member in accordance with the present invention, even if the outer layer is worn away and lost due to the sliding friction with the mating member, and the sliding with the mating member has shifted to that with the partially convex spherical intermediate layer, since each of the partially convex spherical intermediate layers includes a reinforcing member for the partially convex spherical intermediate layer made from the knitted metal wire net which is knitted by using a fine metal wire with a diameter of 0.10 to 0.20 mm and whose mesh size is 1.0 to 3.0 mm long and 0.5 to 2.5 mm wide and a heat-resistant material containing expanded graphite and compressed in such a manner as to fill the meshes of the knitted metal wire net of this reinforcing member and to be formed integrally with that heat-resistant material in mixed form, and since the occupying area ratio of the surface constituted by the reinforcing member for the partially convex spherical intermediate layer on the outer surface of each of the partially convex spherical intermediate layers is 30 to 60%, the sliding with the mating member constantly takes place by the outer surface where the surface constituted by the reinforcing member for the partially convex spherical intermediate layer and the surface constituted by the heat-resistant material for the partially convex spherical intermediate layer are present in mixed form, and the load applied to each of the heat-resistant material and reinforcing member for the partially convex spherical intermediate layer is reduced. As a result, even if very small oscillating motions or excessive axial loads are applied continuously for long periods of time, the possibility of causing damage such as sliding friction tracks on the surface of the mating member is minimal, and it is possible to prevent as practically as possible the coarsening of the mating member surface due to the damage. Hence, it is possible to provide a spherical annular seal member which is capable of preventing as practically as possible a decline in sealability between the partially convex spherical surface of the partially convex spherical intermediate layer and the mating member and of preventing the generation of abnormal frictional noise as practically as possible, as well as a method of manufacturing the same.

DESCRIPTION OF REFERENCE NUMERALS

4, 5, 14, 14a: knitted metal wire net
6: expanded graphite sheet
12: superposed assembly
13: tubular base part
20: sheet for a partially convex spherical intermediate layer
21: tubular base member
23: coating layer
24: multilayer sheet
28: sheet for an outer layer
29: cylindrical preform
36: die
38: cylindrical inner surface
39: partially convex spherical surface
40: annular end face
41: annular end face
42: spherical annular base member
43: partially convex spherical intermediate layer
44: partially convex spherical surface
45: outer layer
46: spherical annular seal member
47: outer surface

The invention claimed is:

1. A spherical annular seal member for use in an exhaust pipe joint comprising: a spherical annular base member defined by a cylindrical inner surface, a partially convex spherical surface, and large- and small-diameter side annular end faces of the partially convex spherical surface; a plurality of partially convex spherical intermediate layers which are formed integrally on the partially convex spherical surface of said spherical annular base member and are laminated in a radial direction; and an outer layer formed integrally on a partially convex spherical surface of an outermost one of said plurality of partially convex spherical intermediate layers, wherein said spherical annular base member includes a first reinforcing member for said spherical annular base member made from a compressed knitted metal wire net which is knitted by using a fine metal wire with a diameter of 0.28 to 0.32 mm and whose mesh size is 4 to 6 mm long and 3 to 5 mm wide and a heat-resistant material for said spherical annular base member containing expanded graphite and compressed in such a manner as to fill meshes of the knitted metal wire net of the first reinforcing member and to be formed integrally with the first reinforcing member in mixed form, wherein each of said partially convex spherical intermediate layers includes a second reinforcing member for said partially convex spherical intermediate layer made from the compressed knitted metal wire net which is knitted by using a fine metal wire with a diameter of 0.10 to 0.20 mm and whose mesh size is 1.0 to 3.0 mm long and 0.5 to 2.5 mm wide and a heat-resistant material for said partially convex spherical intermediate layer containing expanded graphite and compressed in such a manner as to fill meshes of the knitted metal wire net of the second reinforcing member for said partially convex spherical intermediate layer and to be formed integrally with the second reinforcing member in mixed form, an occupying area ratio of a surface constituted by the second reinforcing member for said partially convex spherical intermediate layer on an outer surface of each of said partially convex spherical intermediate layers being 30 to 60%, and wherein said outer layer includes a third reinforcing member for said outer layer made from a compressed knitted metal wire net which is knitted by using a fine metal wire with a diameter of 0.10 to 0.20 mm and whose mesh size is 1.0 to 3.0 mm long and 0.5 to 2.5 mm wide, a solid lubricant consisting of a lubricating composition, and a heat-resistant material for said outer layer containing expanded graphite, the heat-resistant material for said outer layer and the solid lubricant being compressed in such a manner as to fill meshes of the knitted metal wire net of the reinforcing member for said outer layer, an outer surface of said outer layer being formed into a smooth composite surface in which a surface constituted by the third reinforcing member for said outer layer and a surface constituted by the solid lubricant are exposed in mixed form, an occupying area ratio of the surface constituted by the third reinforcing member for said outer layer on the outer surface of said outer layer being 30 to 60%.

2. The spherical annular seal member according to claim 1, wherein the lubricating composition contains 23 to 57% by mass of a hexagonal boron nitride, 5 to 15% by mass of hydrated alumina, and 33 to 67% by mass of a polytetrafluoroethylene resin.

3. The spherical annular seal member according to claim 1, wherein each of the heat-resistant materials for said spherical annular base member, said partially convex spherical intermediate layer, and said outer layer further contains 1.0 to 16.0% by mass of a phosphate in addition to expanded graphite.

4. The spherical annular seal member according to claim 3, wherein each of the heat-resistant materials for said spherical annular base member, said partially convex spherical intermediate layer, and said outer layer further contains 0.05 to 5.0% by mass of a phosphoric acid.

5. A method of manufacturing a spherical annular seal member for use in an exhaust pipe joint and including a spherical annular base member defined by a cylindrical inner surface, a partially convex spherical surface, and large- and small-diameter side annular end faces of the partially convex spherical surface; a plurality of partially convex spherical intermediate layers which are formed integrally on the partially convex spherical surface of said spherical annular base member and are laminated in a radial direction; and an outer layer formed integrally on a partially convex spherical surface of an outermost one of said plurality of partially convex spherical intermediate layers comprising the steps of:

(a) preparing an expanded graphite sheet constituted by expanded graphite;

(b) preparing a belt-shaped knitted metal wire net which is knitted by using a fine metal wire with a diameter of 0.28 to 0.32 mm and whose mesh size is 4 to 6 mm long and 3 to 5 mm wide;

(c) after forming a superposed assembly by superposing the belt-shaped knitted metal wire net on the expanded graphite sheet, convoluting the superposed assembly into a hollow cylindrical shape, to thereby form a tubular base part;

(d) inserting another expanded graphite sheet constituted by expanded graphite between two layers of a hollow cylindrical knitted metal wire net which is knitted by using a fine metal wire with a diameter of 0.10 to 0.20 mm and whose mesh size is 1.0 to 3.0 mm long and 0.5 to 2.5 mm wide, and forming the hollow cylindrical knitted metal wire net into a flattened knitted metal wire net by pressurizing the hollow cylindrical knitted metal wire net with the other expanded graphite sheet inserted therein in a thicknesswise direction of the other expanded graphite sheet, to thereby form a sheet for said partially convex spherical intermediate layer in which the expanded graphite of the other expanded graphite sheet is filled in meshes of the flattened knitted metal wire net and which is constituted by the expanded graphite of the other expanded graphite sheet and the flattened knitted metal wire net integrated with the expanded graphite in mixed form, an occupying area ratio of a surface constituted by the flattened knitted metal wire net on an outer surface where the surface constituted by the flattened knitted metal wire net and a surface constituted by the expanded graphite of the other expanded graphite sheet are present in mixed form being 30 to 60%;

(e) convoluting the sheet for said partially convex spherical intermediate layer around an outer peripheral surface of the tubular base part by at least two turns, to thereby form a tubular base member;

(f) preparing still another expanded graphite sheet constituted by expanded graphite and forming a coating layer of a solid lubricant on one surface of the still other expanded graphite sheet, to thereby form a multilayer sheet;

(g) inserting the multilayer sheet between two layers of another hollow cylindrical knitted metal wire net and forming the other hollow cylindrical knitted metal wire net into another flattened knitted metal wire net by pressurizing the other hollow cylindrical knitted metal wire net with the multilayer sheet inserted between the two layers in a thicknesswise direction of the multilayer sheet, to thereby form a sheet for said outer layer in which the expanded graphite of the still other expanded graphite sheet of the multilayer sheet and the solid lubricant of the coating layer formed on one surface of the expanded graphite sheet are filled in meshes of the other flattened knitted metal wire net and which is constituted by the expanded graphite of the still other expanded graphite sheet, the solid lubricant of the coating layer, and the other flattened knitted metal wire net integrated with the expanded graphite and the solid lubricant in mixed form, an occupying area ratio of a surface constituted by the other flattened knitted metal wire net on an outer surface where the surface constituted by the other flattened knitted metal wire net, a surface constituted by the expanded graphite of the still other expanded graphite sheet, and a surface constituted by the solid lubricant of the coating layer formed on one surface of the still other expanded graphite sheet are present in mixed form being 30 to 60%;

(h) convoluting the sheet for said outer layer around an outer peripheral surface of the tubular base member in a state in which the outer surface of the sheet for said outer layer where the surface constituted by the other belt-shaped knitted metal wire net, the surface constituted by the expanded graphite, and the surface constituted by the solid lubricant are present in mixed form is placed on an outer side, to thereby form a cylindrical preform; and (i) fitting the cylindrical preform over an outer peripheral surface of a core of a die, placing the core in the die, and subjecting the cylindrical preform to compression forming in the die in an axial direction of the core, wherein said the spherical annular base member includes a first reinforcing member for said spherical annular base member made from the compressed knitted metal wire net which is knitted by using the fine metal wire with the diameter of 0.28 to 0.32 mm and whose mesh size is 4 to 6 mm long and 3 to 5 mm wide and a heat-resistant material for said spherical annular base member containing the expanded graphite and compressed in such a manner as to fill the meshes of the knitted metal wire net of the first reinforcing member and to be formed integrally with the first reinforcing member in mixed form, wherein each of said partially convex spherical intermediate layers includes a second reinforcing member for said partially convex spherical intermediate layer made from the compressed knitted metal wire net which is knitted by using a fine metal wire with the diameter of 0.10 to 0.20 mm and whose mesh size is 1.0 to 3.0 mm long and 0.5 to 2.5 mm wide and a heat-resistant material for said partially convex spherical intermediate layer containing the expanded graphite and compressed in such a manner as to fill the meshes of the knitted metal wire net of the second reinforcing member for said partially convex spherical intermediate layer and to be formed integrally with the second reinforcing member in mixed form, the occupying area ratio of the surface constituted by the reinforcing member for said partially convex spherical intermediate layer on the outer surface of each of said partially convex spherical intermediate layers being 30 to 60%, and wherein said outer layer includes a third reinforcing member for said outer layer made from a compressed knitted metal wire net which is knitted by using a fine metal wire with a diameter of 0.10 to 0.20 mm and whose mesh size is 1.0 to 3.0 mm long and 0.5 to 2.5 mm wide, a solid lubricant consisting of a lubricating composition, and a heat-resistant material for said outer layer containing expanded graphite, the heat-resistant material for said outer layer and the solid lubricant being compressed in such a manner as to be filled in meshes of the metal wire net of the third reinforcing member for said outer layer, an outer surface of said outer layer being formed into a smooth composite surface in which a surface constituted by the third reinforcing member for said outer layer and a surface constituted by the solid lubricant are exposed in mixed form, the occupying area ratio of the surface constituted by the heat-resistant material for said outer layer on the outer surface of said outer layer being 30 to 60%.

6. The method of manufacturing a spherical annular seal member according to claim 5, wherein an aqueous dispersion, in which a hexagonal boron nitride powder and a polytetrafluoroethylene resin powder are dispersedly contained in an alumina sol in which hydrated alumina particles are dispersedly contained in water containing an acid as a dispersion medium and whose hydrogen ion concentration (pH) exhibits 2 to 3, is applied to the one surface of the still other expanded graphite sheet to form a coating layer of the solid lubricant on that one surface, thereby forming the multilayer sheet, the aqueous dispersion dispersedly containing as a solid content 30 to 50% by mass of the lubricating composition containing 23 to 57% by mass of the hexagonal boron nitride powder, 33 to 67% by mass of the polytetrafluoroethylene resin powder, and 5 to 15% by mass of hydrated alumina.

7. The method of manufacturing a spherical annular seal member according to claim 5, wherein each of the expanded graphite sheets contains 1.0 to 16.0% by mass of a phosphate in addition to the expanded graphite.

8. The method of manufacturing a spherical annular seal member according to claim 7, wherein each of the expanded graphite sheets further contains 0.05 to 5.0% by mass of a phosphoric acid.

\* \* \* \* \*